United States Patent
Kim et al.

(10) Patent No.: US 9,750,005 B2
(45) Date of Patent: Aug. 29, 2017

(54) METHOD AND APPARATUS FOR TRANSMITTING CONTROL INFORMATION IN WIRELESS COMMUNICATION SYSTEM

(71) Applicant: LG ELECTRONICS INC., Seoul (KR)

(72) Inventors: Myoungseob Kim, Seoul (KR); Hanbyul Seo, Seoul (KR); Seungmin Lee, Seoul (KR)

(73) Assignee: LG Electronics Inc., Seoul (KR)

(*) Notice: Subject to any disclaimer, the term of this patent is extended or adjusted under 35 U.S.C. 154(b) by 33 days.

(21) Appl. No.: 14/759,106

(22) PCT Filed: Jan. 6, 2014

(86) PCT No.: PCT/KR2014/000084
§ 371 (c)(1),
(2) Date: Jul. 2, 2015

(87) PCT Pub. No.: WO2014/107062
PCT Pub. Date: Jul. 10, 2014

(65) Prior Publication Data
US 2015/0334688 A1     Nov. 19, 2015

Related U.S. Application Data

(60) Provisional application No. 61/749,384, filed on Jan. 6, 2013.

(51) Int. Cl.
*H04L 5/00* (2006.01)
*H04W 72/04* (2009.01)

(52) U.S. Cl.
CPC ......... *H04W 72/042* (2013.01); *H04L 5/0053* (2013.01); *H04W 72/0413* (2013.01);
(Continued)

(58) Field of Classification Search
CPC ........... H04W 72/042; H04W 72/0406; H04W 72/005; H04W 72/0413; H04L 5/0053; H04L 5/0016; H04L 5/0055; H04L 5/0057
(Continued)

(56) References Cited

U.S. PATENT DOCUMENTS

2012/0320848 A1    12/2012  Chen
2013/0114529 A1*   5/2013   Chen ................... H04L 1/1812
                                                                    370/329
(Continued)

OTHER PUBLICATIONS

"PUCCH A/N resource allocation for EPDCCH, R1-124985, 3GPP TSG RAN WG1 Meeting #71, New Orleans, USA, Nov. 12th-16th, 2012" LG ELectronics.
(Continued)

*Primary Examiner* — Kwang B Yao
*Assistant Examiner* — Syed M Bokhari
(74) *Attorney, Agent, or Firm* — Dentons US LLP

(57) ABSTRACT

One embodiment of the present invention relates to a method by which a base station transmits control information through an enhanced physical downlink control channel (EPDCCH) in a wireless communication system, and the control information transmission method comprises the steps of: mapping control information to an enhanced resource-element group (EREG) allocated to transmit the EPDCCH in a first EPDCCH physical resource block (PRB) set and a second EPDCCH PRB set, respectively; and transmitting the mapped control information, wherein an enhanced control channel element (ECCE) index corresponding to the EREG of the same position is connected with the same physical uplink control channel resource (PUCCH) in the first EPDCCH PRB set and the second EPDCCH PRB set, respectively.

11 Claims, 14 Drawing Sheets

(a)

(b)

(52) U.S. Cl.
CPC .......... *H04L 5/0016* (2013.01); *H04L 5/0055* (2013.01); *H04L 5/0057* (2013.01)

(58) Field of Classification Search
USPC .......................................................... 370/329
See application file for complete search history.

(56) References Cited

U.S. PATENT DOCUMENTS

| | | | |
|---|---|---|---|
| 2014/0044062 A1* | 2/2014 | Ye ..................... | H04W 72/0453 370/329 |
| 2014/0092820 A1* | 4/2014 | Ye ..................... | H04W 72/0406 370/329 |
| 2014/0185568 A1* | 7/2014 | Ji ......................... | H04L 5/0048 370/329 |

OTHER PUBLICATIONS

"Mapping of ECCE to EREG for localized and distributed transmission, R1-124697, 3GPP TSG RAN WG1 Meeting #71, New Orleans, USA, Nov. 12-16, 2012" Huawei, HiSilicon.

"ECCE/EREG to RE mapping for EPDCCH, R1-124783; 3GPP TSG RAN WG1 Meeting #71, New Orleans, USA, Nov. 12th-16th, 2012" Panasonic.

EREG Mapping, R1-124920, 3GPP TSG RAN WG1 #71; New Orleans, USA, Nov. 12-16, 2012, Samsung.

\* cited by examiner

FIG. 9
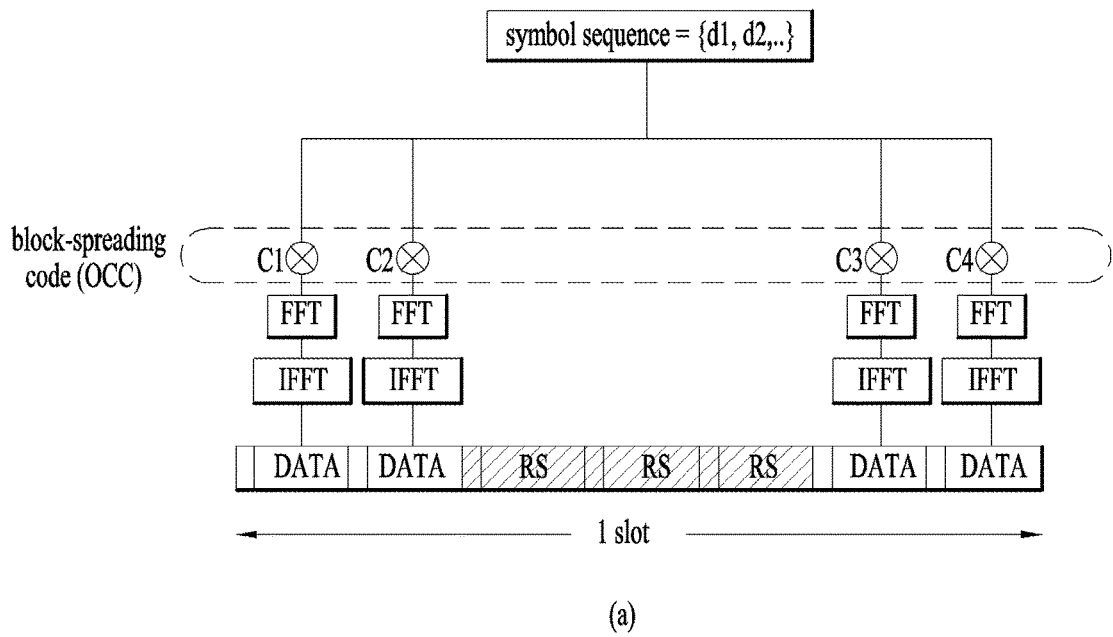
(a)
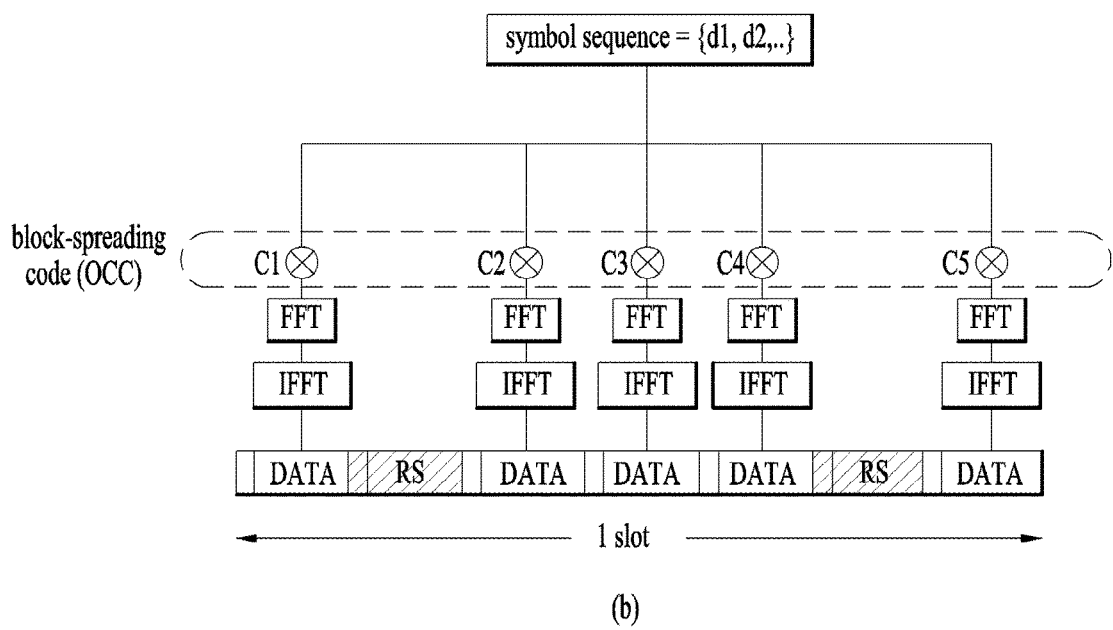
(b)

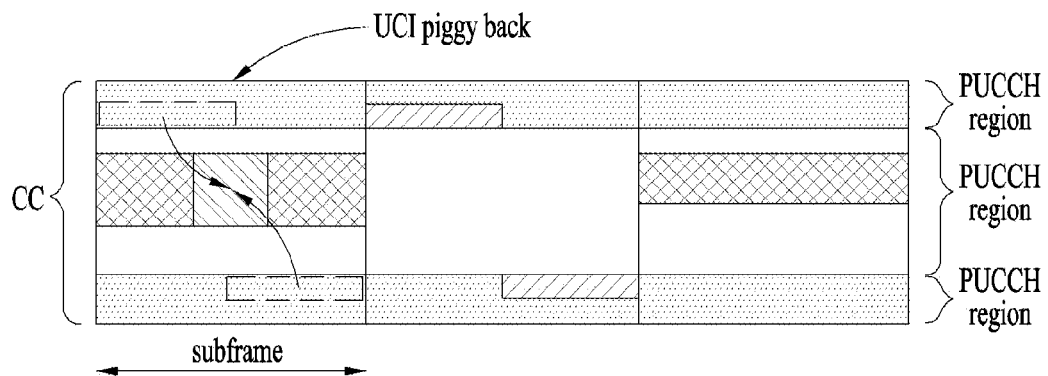

| ECCE index (Set 1) | Indices of impacted ECCEs (Set 2) | | |
|---|---|---|---|
| 0 | 0 | 14 | 10 |
| 1 | 1 | 15 | 11 |
| 2 | 2 | 0 | 14 |
| 3 | 3 | 1 | 4 |
| 4 | 4 | 2 | 5 |
| 5 | 5 | 3 | 6 |
| 6 | 6 | 12 | 7 |
| 7 | 7 | 13 | 8 |
|   |   |   | 9 |

(b)

| ECCE index (Set 1) | Indices of impacted ECCEs (Set 2) | | |
|---|---|---|---|
| 0 | 0 | 14 | 10 |
| 1 | 1 | 15 | 11 |
| 2 | 2 | 0 | 12 |
| 3 | 3 | 1 | 13 |
| 4 | 4 | 2 | 14 |
| 5 | 5 | 3 | 15 |
| 6 | 6 | 12 | 8 |
| 7 | 7 | 13 | 9 |
|   |   |   | 10 |
|   |   |   | 11 |

(c)

| ECCE index (Set 1) | Indices of impacted ECCEs (Set 2) | | |
|---|---|---|---|
| 0 | 0 | 14 | 10 |
| 1 | 1 | 15 | 12 |
| 2 | 2 | 0 | 13 |
| 3 | 3 | 1 | 14 |
| 4 | 4 | 2 | 15 |
| 5 | 5 | 3 | 8 |
| 6 | 6 | 12 | 9 |
| 7 | 7 | 13 | 10 |
|   |   |   | 11 |

FIG. 14

| ECCE index (Set 1) | Indices of impacted ECCEs (Set 2) | | | |
|---|---|---|---|---|
| 0 | 0 | 14 | 12 | 10 |
| 1 | 1 | 15 | 13 | 11 |
| 2 | 2 | 0 | 14 | 4 |
| 3 | 3 | 1 | 15 | 5 |
| 4 | 4 | 2 | 8 | 6 |
| 5 | 5 | 3 | 9 | 7 |
| 6 | 6 | 12 | 10 | 8 |
| 7 | 7 | 13 | 11 | 9 |

| | | | | | | | |
|---|---|---|---|---|---|---|---|
| 0 | 0, 2, ... | 0 | 0, 2, ... | 0 | 0, 2, ... | 0 | 0, 2, ... |
| | | 1 | 32, 34, ... | | | 8 | 32, 34, ... |
| 1 | 1, 3, ... | 2 | 1, 3, ... | 1 | 1, 3, ... | 1 | 1, 3, ... |
| | | 3 | 33, 35, ... | | | 9 | 33, 35, ... |
| 2 | 0, 2, ... | 4 | 0, 2, ... | 2 | 0, 2, ... | 2 | 0, 2, ... |
| | | 5 | 32, 34, ... | | | 10 | 32, 34, ... |
| 3 | 1, 3, ... | 6 | 1, 3, ... | 3 | 1, 3, ... | 3 | 1, 3, ... |
| | | 7 | 33, 35, ... | | | 11 | 33, 35, ... |
| 4 | 0, 2, ... | 8 | 0, 2, ... | 4 | 0, 2, ... | 4 | 0, 2, ... |
| | | 9 | 32, 34, ... | | | 12 | 32, 34, ... |
| 5 | 1, 3, ... | 10 | 1, 3, ... | 5 | 1, 3, ... | 5 | 1, 3, ... |
| | | 11 | 33, 35, ... | | | 13 | 33, 35, ... |
| 6 | 0, 2, ... | 12 | 0, 2, ... | 6 | 0, 2, ... | 6 | 0, 2, ... |
| | | 13 | 32, 34, ... | | | 14 | 32, 34, ... |
| 7 | 1, 3, ... | 14 | 1, 3, ... | 7 | 1, 3, ... | 7 | 1, 3, ... |
| | | 15 | 33, 35, ... | | | 15 | 33, 35, ... |

(a)                   (b)

METHOD AND APPARATUS FOR TRANSMITTING CONTROL INFORMATION IN WIRELESS COMMUNICATION SYSTEM

This application is a 35 USC §371 National Stage entry of International Application No. PCT/KR2014/000084 filed on Jan. 6, 2014 and claims priority to U.S. Provisional Application No. 61/749,384, filed Jan. 6, 2013, all of which are incorporated by reference in their entirety herein.

TECHNICAL FIELD

Following description relates to a wireless communication system, and more particularly, to a method of transmitting control information via EPDCCH (enhanced physical downlink channel) and an apparatus therefor.

BACKGROUND ART

Wireless communication systems are widely deployed to provide various kinds of communication content such as voice and data. Generally, these communication systems are multiple access systems capable of supporting communication with multiple users by sharing available system resources (e.g., bandwidth and transmit power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

DISCLOSURE OF THE INVENTION

Technical Task

When control information is transmitted via EPDCCH, in particular, when a set including a plurality of physical resource block pairs is used, an object of the present invention is to provide methods of managing the set.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to a first technical aspect of the present invention, a method of transmitting control information, which is transmitted by a base station via EPDCCH (enhanced physical downlink control channel) in a wireless communication system includes the steps of mapping the control information to an EREG (enhanced resource-element group) allocated for EPDCCH transmission in a first EPDCCH PRB (physical resource block) set and a second EPDCCH PRB set, respectively and transmitting the mapped control information. In this case, an ECCE (enhanced control channel element) index corresponding to an EREG of a same position is associated with an identical PUCCH (physical uplink control channel) resource in the first EPDCCH PRB set and the second EPDCCH PRB set, respectively.

To further achieve these and other advantages and in accordance with the purpose of the present invention, according to a second technical aspect of the present invention, a base station device in a wireless communication system includes a reception module and a processor, the processor configured to map the control information to an EREG (enhanced resource-element group) allocated for EPDCCH transmission in a first EPDCCH PRB (physical resource block) set and a second EPDCCH PRB set, respectively, the processor configured to transmit the mapped control information. In this case, an ECCE (enhanced control channel element) index corresponding to an EREG of a same position is associated with an identical PUCCH (physical uplink control channel) resource in the first EPDCCH PRB set and the second EPDCCH PRB set, respectively.

The first technical aspect and the second technical aspect of the present invention can include followings.

The first EPDCCH PRB set can include PRB pairs of which an ECCE index corresponding to an EREG is 1/n multiple of an ECCE index corresponding to an EREG positioned at an identical position of the EREG in the second EPDCCH PRB set.

The n may correspond to the number of PRB pairs of the second EPDCCH PRB set divided by the number of PRB pairs of the first EPDCCH PRB set.

An ECCE index (n*k+m) may be associated with a PUCCH resource corresponding to an index (p*m+k) related to a PUCCH resource in the second EPDCCH PRB set, the n may correspond to the number of PRB pairs of the second EPDCCH PRB set divided by the number of PRB pairs of the first EPDCCH PRB set, the k may correspond to 0, . . . , (the number of ECCEs contained in the first EPDCCH PRB set), the m may correspond to 0, . . . , n−1 and the p may correspond to the number of PUCCH resources associated with the first EPDCCH PRB set.

The PRB pairs included in the first EPDCCH PRB set may correspond to a subset of the PRB pairs included in the second EPDCCH PRB set.

The first EPDCCH PRB set includes PRB pairs of which an ECCE index corresponding to an EREG is 1/n multiple of an ECCE index corresponding to an EREG positioned at an identical position of the EREG in the second EPDCCH PRB set and an ECCE index in the first EPDCCH PRB set and the second EPDCCH PRB set may follow a first ECCE number-EREG number-PRB number relation, which is applied when the number of PRB pairs included in an EPDCCH PRB set is equal to or less than 8.

If the ECCE index corresponding to the EREG positioned at the identical position follows a second ECCE number-EREG number-PRB number relation, which is applied when the number of PRB pairs of the second EPDCCH PRB set exceeds 8, the ECCE index may be identical to each other in the first EPDCCH PRB set and the second EPDCCH PRB set.

In case of the first ECCE number-EREG number-PRB number relation, an ECCE index of EPDCCH PRB set corresponds to an EREG index $$\left\lfloor \frac{n_{ECCE}}{N_P} \right\rfloor + i * N_{CP} \text{ in a } PRB \text{ pair}$$

$$\text{index}\left(n_{ECCE} + i * \max\left(1, \left\lfloor \frac{N_P}{N} \right\rfloor\right)\right) \mod N_P, \text{ in case of}$$

the second ECCE-EREG number-PRB number relation, an ECCE index of each $$EPDCCH\ PRB\ \text{pair corresponds to an } EREG \text{ index } \left\lfloor \frac{n_{ECCE}}{N_{P,set1}} \right\rfloor \mod N_{CP} +$$

$$i*N_{CP} \text{ in a } PRB \text{ pair index } \frac{N_{P,set2}}{N_{P,set1}} * \left\lfloor \left\{ n_{ECCE} + i*\max\left(1, \left\lfloor \frac{N_{P,set2}}{N} \right\rfloor\right) \right\} \mod N_{P,set1} \right\rfloor + \left\lfloor \frac{n_{ECCE}}{N_{P,set1}*N_{CP}} \right\rfloor,$$

the N may correspond to the number of EREGs per ECCE, the $N_{CP}$ may correspond to the number of ECCEs per PRB pair, the $N_P$ may correspond to the number of PRB pairs of an EPDCCH PRB set, the $N_{P,set1}$ may correspond to the number of PRB pairs of the first EPDCCH PRB set, the $N_{P,set2}$ may correspond to the number of PRB pairs of the second EPDCCH PRB set and the i may correspond to 0, 1, . . . , N−1.

An ECCE index of each EPDCCH PRB pair may correspond to an $$EREG \text{ index } \left\lfloor \frac{n_{ECCE}}{N_{P,set1}} \right\rfloor \mod N_{CP} + i*N_{CP} \text{ in a } PRB \text{ pair}$$

$$\text{index } \frac{N_{P,set2}}{N_{P,set1}} * \left[ \left\{ n_{ECCE} + i*\max\left(1, \left\lfloor \frac{N_{P,set1}}{N} \right\rfloor\right) \right\} \mod N_{P,set1} \right] +$$

$$\left\lfloor \frac{n_{ECCE}}{N_{P,set1}*N_{CP}} \right\rfloor, \text{ the } N \text{ may}$$

correspond to the number of EREGs per ECCE, the $N_{CP}$ may correspond to the number of ECCEs per PRB pair, the $N_{P,set1}$ may correspond to the number of PRB pairs of the first EPDCCH PRB set, the $N_{P,set2}$ may correspond to the number of PRB pairs of the second EPDCCH PRB set and the i may correspond to 0, 1 . . . . , N−1.

An ECCE index of each EPDCCH PRB pair may correspond to an $$EREG \text{ index } \left\lfloor \frac{n_{ECCE}}{N_{P,set2}} \right\rfloor \mod N_{CP} +$$

$$i*N_{CP} \text{ in a } PRB \text{ pair index } \left\{ n_{ECCE} + i*\max\left(1, \left\lfloor \frac{N_{P,set1}}{N} \right\rfloor\right) \right\} \mod N_{P,set1} +$$

$$N_{P,set1} * \left\lfloor \frac{n_{ECCE}}{N_{P,set1}*N_{CP}} \right\rfloor, \text{ the } N \text{ may}$$

correspond to the number of EREGs per ECCE, the $N_{CP}$ may correspond to the number of ECCEs per PRB pair, the $N_{P,set1}$ may correspond to the number of PRB pairs of the first EPDCCH PRB set, the $N_{P,set2}$ may correspond to the number of PRB pairs of the second EPDCCH PRB set and the i may correspond to 0, 1, . . . , N−1.

An ECCE index corresponding to an EREG of an identical position may be identical to a PRB pair index in the first EPDCCH PRB set and the second EPDCCH PRB set.

The first EPDCCH PRB set and the second EPDCCH PRB set may be related to distributed EPDCCH transmission

Advantageous Effects

According to the present invention, although a plurality of sets including many numbers of physical resource block pairs are used and a plurality of the sets are overlapped with each other, it is able to minimize mutual impact on each of a plurality of the sets. Moreover, it is able to solve a resource collision problem for transmitting a reception confirmation response.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 9 is a diagram for a PUCCH channel structure using block spreading;
FIG. 10 is a diagram for explaining a method of transmitting uplink control information via PUSCH;
FIG. 11 is a diagram for a mapping relation between an EREG (enhanced resource-element group) and an ECCE (enhanced control channel element);
FIGS. 12 to 14 are diagrams for explaining a first embodiment of the present invention;
FIGS. 15 to 16 are diagrams for explaining a second embodiment of the present invention.

BEST MODE

Mode for Invention

Figure 1:
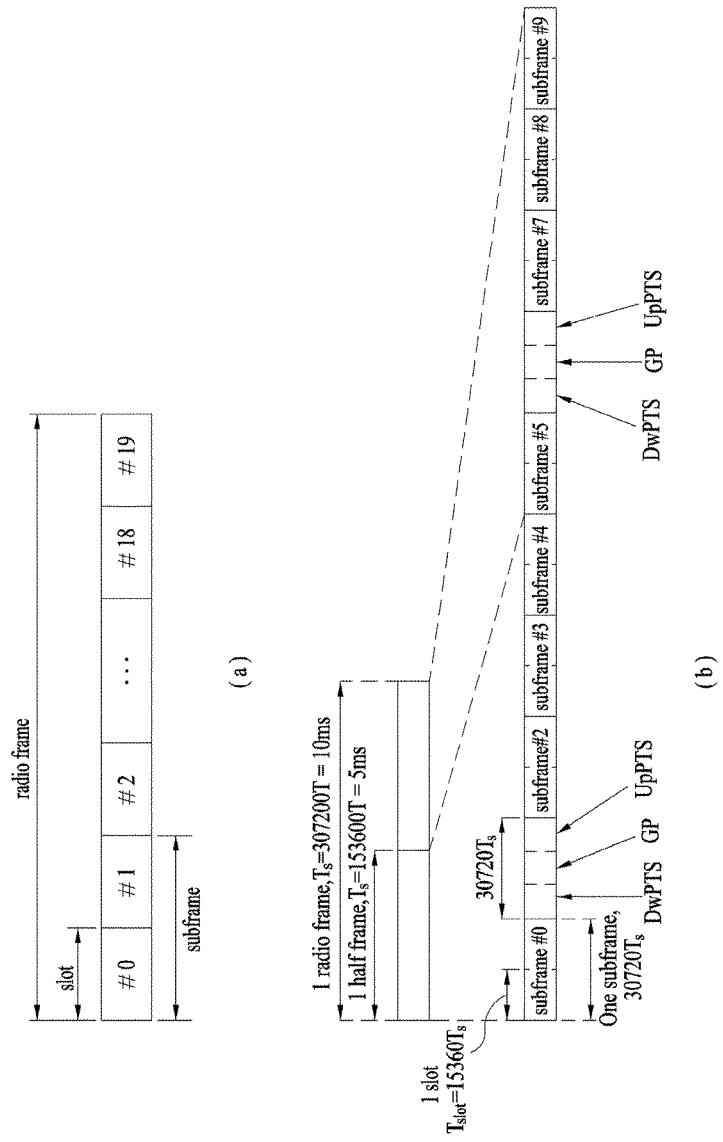
FIG. 1 is a diagram for a radio frame structure.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Embodiments of the present invention will be described, focusing on a data communication relationship between a base station and a terminal. The base station serves as a terminal node of a network over which the base station directly communicates with the terminal. Specific operations illustrated as being conducted by the base station in this specification may also be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point". The term "relay" may be replaced with such terms as "relay node (RN)" and "relay station (RS)". The term "terminal" may also be replaced with such terms as "user equipment (UE)," "a mobile station (MS)," "mobile subscriber station (MSS)" and "subscriber station (SS)".

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on 3GPP LTE and 3GPP LTE-A systems. However, the spirit of the present invention is not limited thereto.

LTE/LTE-A Resource Structure/Channel

Hereinafter, a radio frame structure will be described with reference to FIG. 1.

In a cellular OFDM wireless packet communication system, an uplink (UL)/downlink (DL) data packet is transmitted on a subframe basis, and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE adopts OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol extends and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 1(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

Herein, the illustrated radio frame structures are merely examples, and various modifications may be made to the number of subframes included in a radio frame, the number of slots included in a subframe, or the number of symbols included in a slot.

Figure 2:
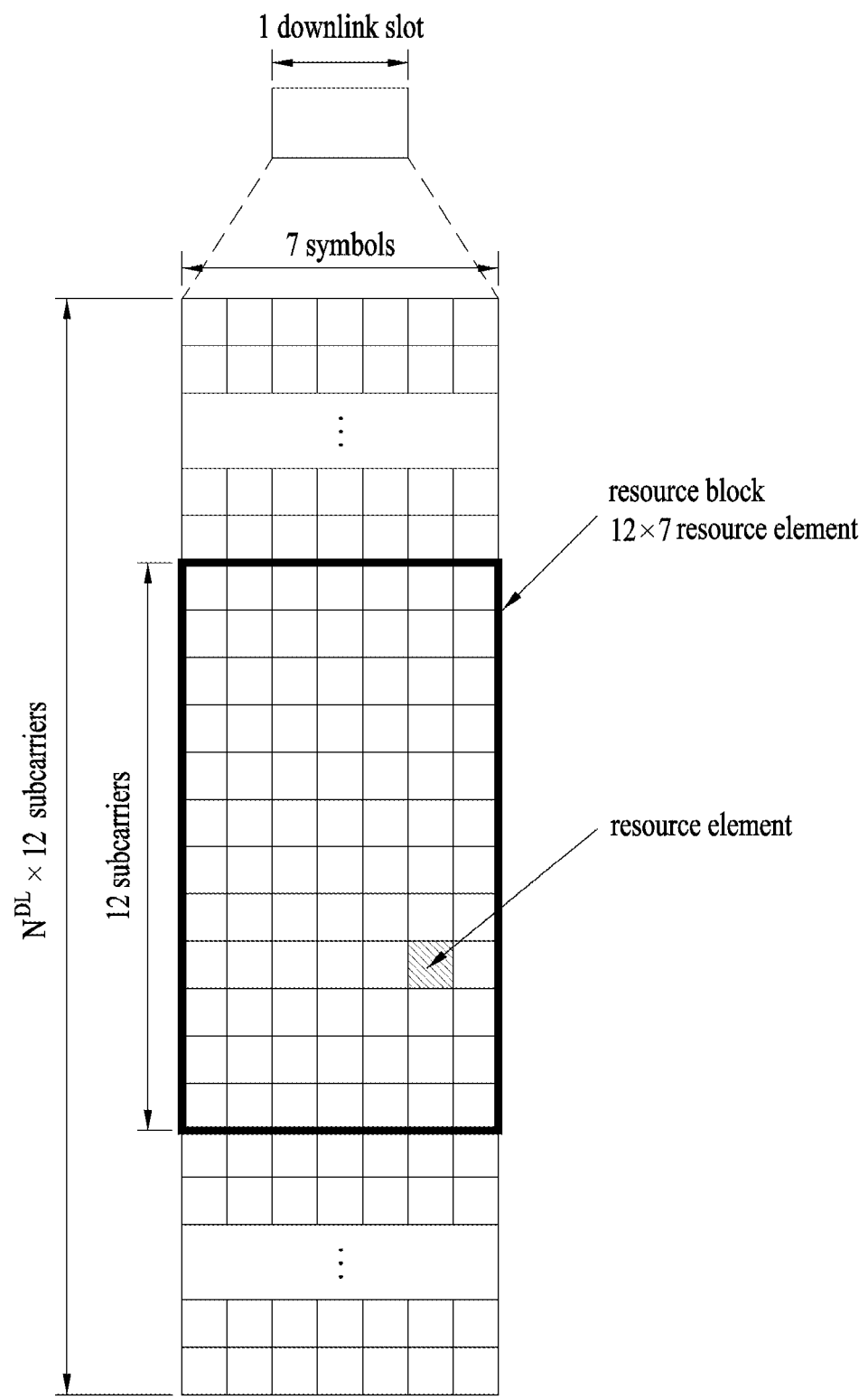
FIG. 2 is a diagram for a resource grid of a downlink slot.

FIG. 2 is a diagram illustrating a resource grid for one DL slot. A DL slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a resource element (RE). An RB includes 12×7 REs. The number $N^{DL}$ of RBs included in a downlink slot depends on a DL transmission bandwidth. A UL slot may have the same structure as a DL slot.

Figure 3:
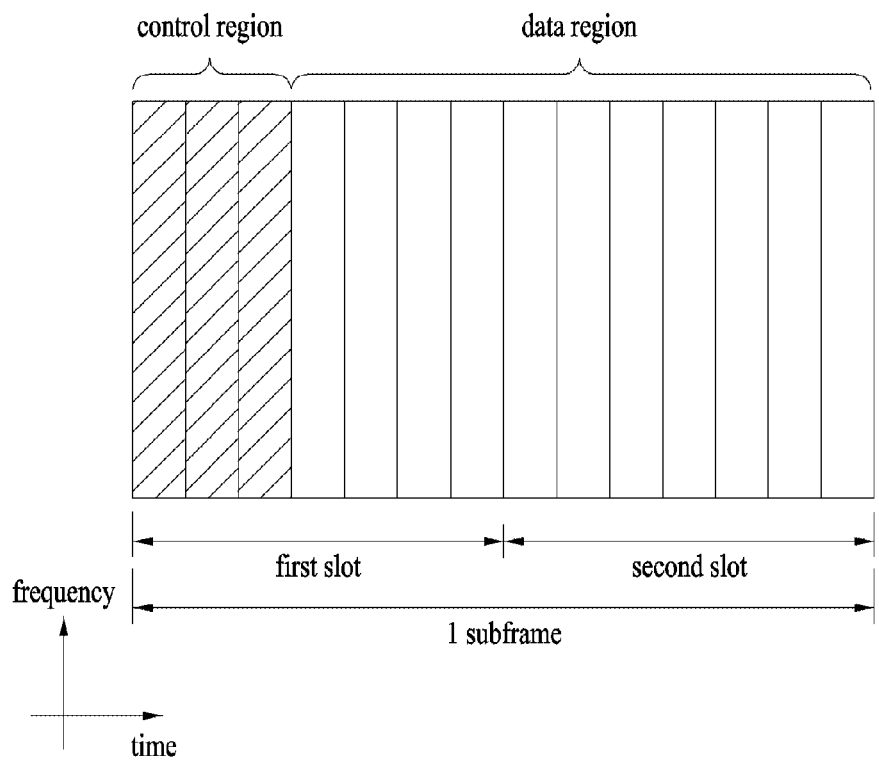
FIG. 3 is a diagram for a structure of a downlink subframe.

FIG. 3 illustrates a DL subframe structure. Up to the first three OFDM symbols of the first slot in a DL subframe used as a control region to which control channels are allocated and the other OFDM symbols of the DL subframe are used as a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted at the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or UL transmission power control commands for UE groups. The PDCCH delivers information about resource allocation and a transport format for a DL shared channel (DL-SCH), resource allocation information about an UL shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, and voice over internet protocol (VoIP) activation information. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and a coding rate provided by the CCEs. An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

Figure 4:
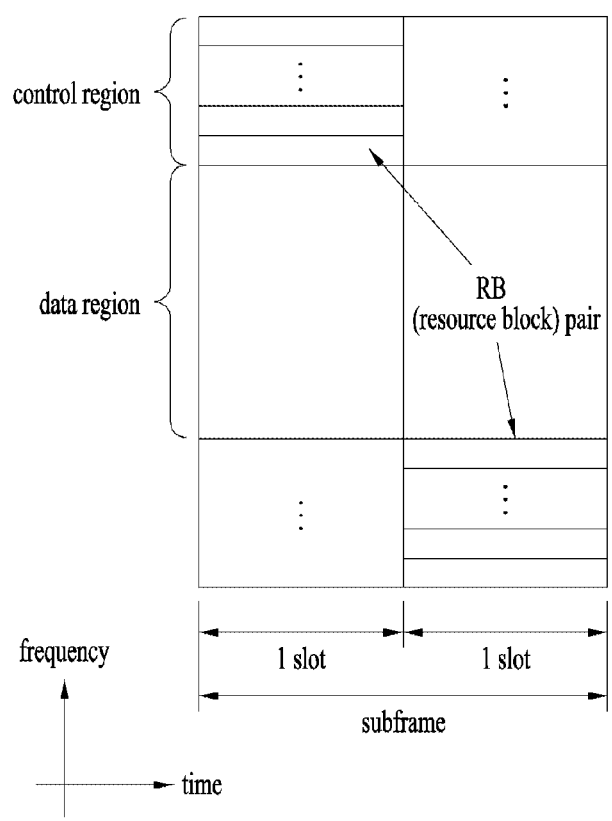
FIG. 4 is a diagram for a structure of an uplink subframe.

FIG. 4 illustrates a UL subframe structure. A UL subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs of the RB pair occupy different subcarriers in two slots. This is often called frequency hopping of the RB pair allocated to the PUCCH over a slot boundary.

PUCCH

UL control information (UCI) transmitted over a PUCCH may include a scheduling request (SR), HARQ ACK/NACK information, and DL channel measurement information.

The HARQ ACK/NACK information may be generated depending on whether decoding of a DL data packet on a PDSCH is successful. In a conventional wireless communication system, 1 bit is transmitted as ACK/NACK information for DL single codeword transmission and 2 bits are transmitted as ACK/NACK information DL 2-codeword transmission.

The channel measurement information may refer to feedback information associated with a multiple input multiple output (MIMO) scheme and include a channel quality indicator (CQI), a precoding matrix index (PMI), and a rank indicator (RI). The channel measurement information may be collectively referred to as CQI. 20 bits may be used per subframe to transmit CQI.

The PUCCH may be demodulated using a binary phase shift keying (BPSK) scheme and a quadrature phase shift keying (QPSK) scheme. Control information of a plurality of UEs may be transmitted over the PUCCH. When code division multiplexing (CDM) is performed to distinguish between signals of UEs, constant amplitude zero autocorrelation (CAZAC) with a length of 12 is mainly used. The CAZAC sequence has characteristics of maintaining a constant amplitude in the time domain and frequency domain and thus is suitable for reduction in peak-to-average power ratio (PAPR) or cubic metric (CM) of a UE to increase coverage. In addition, ACK/NACK information in response to DL data transmitted over a PUCCH is covered using an orthogonal sequence or orthogonal cover (OC).

In addition, control information transmitted on a PUCCH may be distinguished using cyclically shifted sequences having different cyclic shift (CS) values. A cyclically shifted sequence may be generated by cyclically shifting a base sequence by a specific CS amount. The specific CS amount is indicated by a CS index. The number of available CSs may change depending on channel delay spread. Various types of sequences may be used as the base sequence and the aforementioned CAZAC sequence is an example of the base sequence.

In addition, the amount of control information that a UE can transmit in a subframe may be determined depending on the number of SC-FDMA symbols (i.e., SC-FDMA symbols except for an SC-FDMA symbol used to transmit a reference signal (RS) for coherent detection of PUCCH) that can be used to transmit the control information.

In 3GPP LIE, a PUCCH is defined in seven different formats according to transmitted control information, a modulation scheme and the amount of control information. Attributes of transmitted uplink control information (UCI) for each PUCCH format may be summarized as shown in Table 1.

TABLE 1

| PUCCH format | Modulation Scheme | Number of bits per subframe | Usage | Etc. |
| --- | --- | --- | --- | --- |
| 1 | N/A | N/A | SR (Scheduling Request) | |
| 1a | BPSK | 1 | ACK/NACK | One codeword |
| 1b | QPSK | 2 | ACK/NACK | Two codeword |

TABLE 1-continued

| PUCCH format | Modulation Scheme | Number of bits per subframe | Usage | Etc. |
| --- | --- | --- | --- | --- |
| 2 | QPSK | 20 | CQI | Joint Coding ACK/NACK (extended CP) |
| 2a | QPSK+BPSK | 21 | CQI+ ACK/NACK | Normal CP only |
| 2b | QPSK+BPSK | 22 | CQI+ ACK/NACK | Normal CP only |

PUCCH format 1 is used to transmit an SR only. When the SR is transmitted alone, an unmodulated waveform is applied, which will be described in detail below.

PUCCH format 1a or 1b is used for transmission of HARQ ACK/NACK. When only HARQ ACK/NACK is transmitted in a subframe, PUCCH format 1a or 1b may be used. Alternatively, HARQ ACK/NACK and SR may be transmitted in the same subframe using PUCCH format 1a or 1b.

PUCCH format 2 is used for transmission of CQI, whereas PUCCH format 2a or 2b is used for transmission of CQI and HARQ ACK/NACK. For the extended CP, PUCCH format 2 may be used for transmission of CQI and HARQ ACK/NACK.

Figure 5:
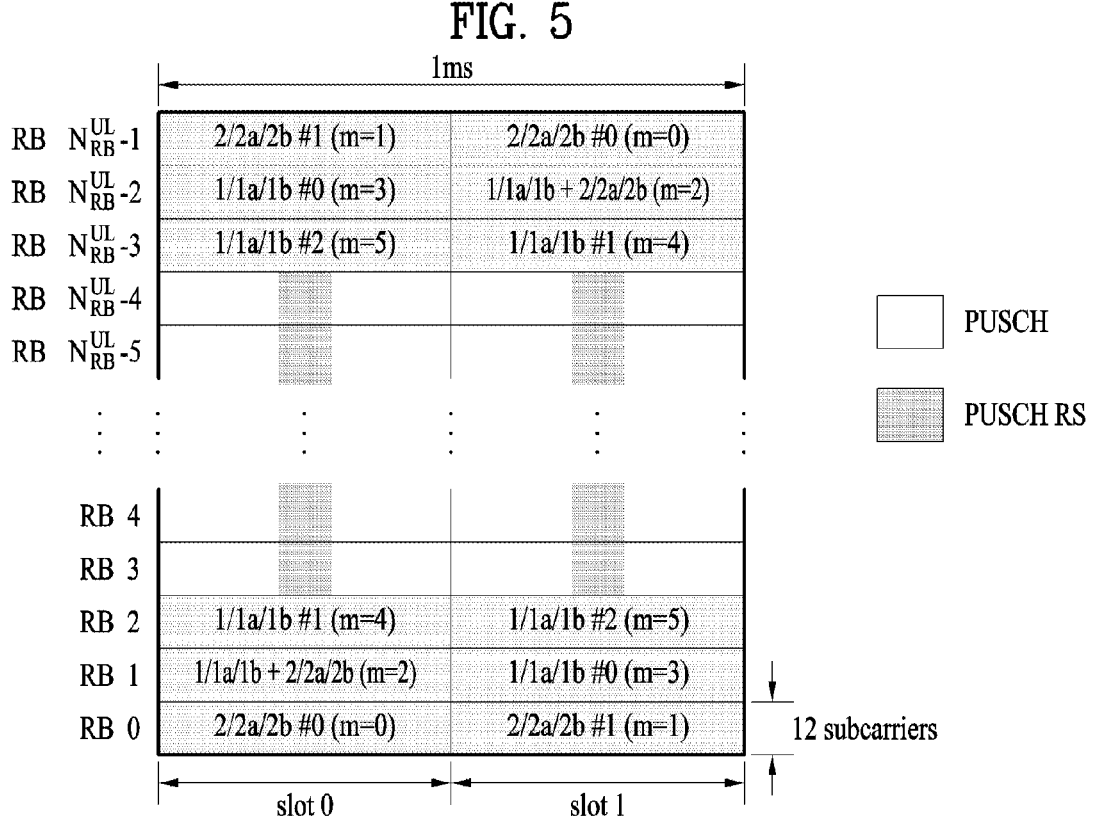
FIG. 5 is a diagram for a form of mapping PUCCH formats in an uplink physical resource block.

FIG. 5 illustrates mapping of PUCCH formats to PUCCH regions in UL physical resource blocks. In FIG. 5, $n_{PUCCI}^{(2)}$ denotes the number of resource blocks on UL, and $0, 1, \ldots, n_{PUCCI}^{(2)}-1$ represent physical resource block numbers. Basically, a PUCCH is mapped to opposite edges of a UL frequency block. As illustrated in FIG. 5, PUCCH formats 2/2a/2b are mapped to PUCCH regions indicated by m=0 and 1, which may represent that PUCCH formats 2/2a/2b are mapped to resource blocks positioned at the band-edges. In addition, PUCCH formats 2/2a/2b and PUCCH formats 1/1a/1b may be mixed and mapped to a PUCCH region indicated by m=2. PUCCH formats 1/1a/1b may be mapped to PUCCH regions indicated by m=3, 4, and 5. The number ($n_{PUCC}^{(1)}$) of available PUCCH RBs may be indicated to UEs in a cell by the PUCCH format 2/2a/2b, through broadcast signaling.

PUCCH Resources

A BS allocates a PUCCH resource for UCI transmission to a UE in an implicit or explicit manner through higher layer signaling.

For ACK/NACK, a plurality of PUCCH resource candidates may be set for the UE by a higher layer. Of the PUCCH resource candidates, a PUCCH resource to be used by the UE may be determined in an implicit manner. For example, the UE may receive a PDSCH from the BS and transmit ACK/NACK for a corresponding data unit through a PUCCH resource implicitly determined by a PDCCH resource that carries scheduling information about the PDSCH.

Figure 6:
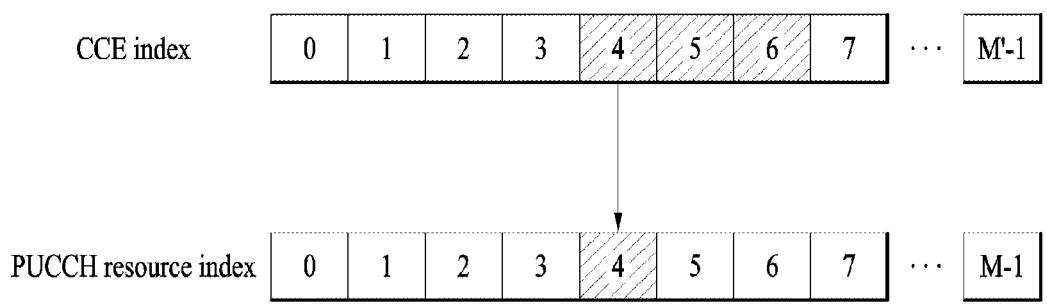
FIG. 6 is a diagram for an example of determining a PUCCH resource for ACK/NACK.

FIG. 6 illustrates an example of determining PUCCH resources for ACK/NACK.

In LTE, a PUCCH resource for ACK/NACK information is not pre-allocated to UEs. Rather, PUCCH resources are used separately by a plurality of UEs within a cell at each time. Specifically, a PUCCH resource that a UE uses to transmit ACK/NACK is implicitly determined based on a PDCCH carrying scheduling information about a PDSCH that delivers the DL data. An entire area in which a PDCCH is transmitted in a DL subframe includes a plurality of control channel elements (CCEs) and a PDCCH transmitted to a UE includes one or more CCEs. A CCE includes a plurality of (e.g., 9) resource element groups (REGs). One REG includes four resource elements (REs) that neighbors each other with an RS excluded. The UE transmits ACK/NACK through an implicit PUCCH resource that is derived or calculated according to a function of a specific CCE index (e.g., the first or lowest CCE index) from among the CCE indexes included in a PDCCH received by the UE.

Referring to FIG. 6, each PUCCH resource index corresponds to a PUCCH resource for ACK/NACK. As illustrated in FIG. 6, suppose that scheduling information about the PDSCH is transmitted to the UE on a PDCCH including CCEs #4, #5 and #6. The UE transmits ACK/NACK to a BS on a PUCCH, for example, PUCCH #4 that is derived or calculated from the lowest CCE index 4 constituting the PDCCH. FIG. 6 illustrates a case in which up to M' CCEs are present in the DL and up to M PUCCHs are present in UL. M may be equal to M', but it is also possible to set M to be different from M' and to map CCEs to PUCCHs in an overlapping manner.

For example, a PUCCH resource index may be determined by the following equation.

$$n_{PUCCH}^{(1)} = n_{CCE} + N_{PUCCH}^{(1)}$$  Equation 1

Herein, $n_{PUCCH}^{(1)}$ denotes the index of a PUCCH resource for transmission of ACK/NACK, and $N_{PUCCH}^{(1)}$ denotes a signaling value received from a higher layer. $n_{CCE}$ may denote the lowest index of the CCE indexes used for transmission of a PDCCH.

PUCCH Channel Structure

PUCCH formats 1a/1b will be described first below.

In PUCCH formats 1a/1b, a symbol modulated using BPSK or QPSK is multiplied by a CAZAC sequence having a length of 12. For example, multiplying a modulation symbol d(0) by a CAZAC sequence r(n) (n=0, 1, 2, ..., N−1) having a length of N gives a result of y(0), y(1), y(2), ..., y(N−1). Symbols y(0), y(1), y(2), ..., and y(N−1) may be called a block of symbols. After the modulation symbol is multiplied by the CAZAC sequence, block-wise-spreading using an orthogonal sequence is applied.

A Hadamard sequence with a length of 4 is employed for general ACK/NACK information, while a discrete Fourier transform (DFT) with a length of 3 is employed for shortened ACK/NACK information and a reference signal. For an extended CP, a Hadamard sequence with a length of 2 is employed for a reference signal.

Figure 7:
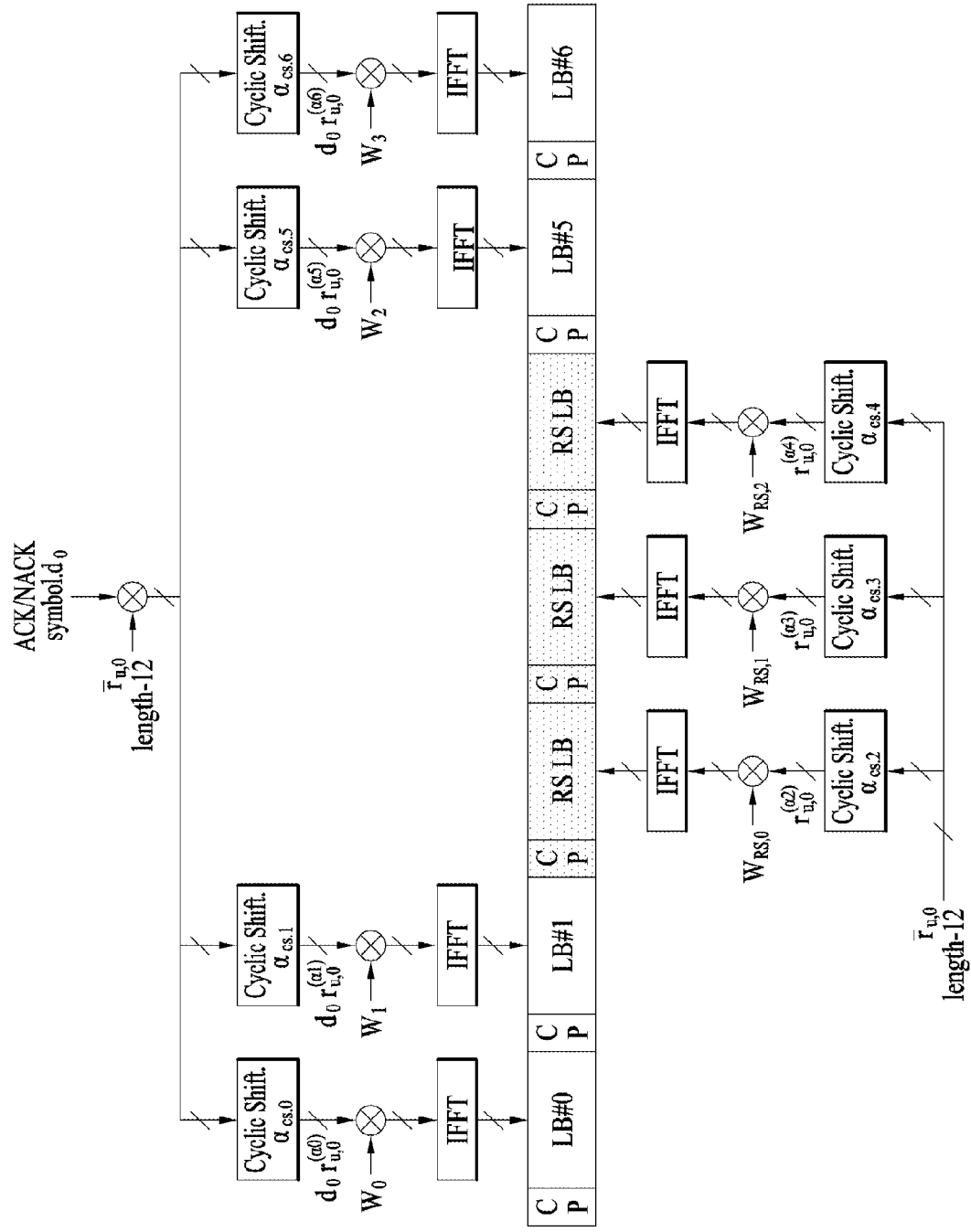
FIG. 7 is a diagram for an ACK/NACK channel structure in case of normal CP.

FIG. 7 illustrates an ACK/NACK channel structure for a normal CP. FIG. 7 exemplarily shows the structure of a PUCCH channel for transmission of HARQ ACK/NACK without CQI. Three consecutive SC-FDMA symbols in the middle of seven SC-FDMA symbols carry RSs and the remaining four SC-FDMA symbols carry ACK/NACK signals. For the extended CP, two consecutive symbols in the middle of SC-FDMA symbols may carry RSs. The number and positions of symbols used for an RS may change depending on a control channel, and the number and positions of symbols used for a ACK/NACK signal associated with the RS may change depending on the number and positions of symbols used for the RS.

1 bit ACK/NACK information and 2-bit ACK/NACK information (which is unscrambled) may be represented in a HARQ ACK/NACK modulation symbol using BPSK and QPSK, respectively. ACK may be encoded as 1, and NACK may be encoded as 0.

When a control signal is transmitted within an allocated band, 2-dimensional spreading is applied to enhance multiplexing capacity. That is, frequency domain spreading and time domain spreading are simultaneously applied to increase the number of UEs or control channels that can be multiplexed. To spread an ACK/NACK signal in the frequency domain, a frequency domain sequence is used as a basic sequence. A Zadoff-Chu (ZC) sequence, one of CAZAC sequences, may be used as the frequency domain sequence. For example, different cyclic shifts (CSs) may be applied to a ZC sequence, which is the basic sequence, to multiplex different UEs or different control channels. The number of CS resources supported by SC-FDMA symbols for PUCCH RBs for HARQ ACK/NACK transmission is set by a cell-specific higher-layer signaling parameter ($\Delta_{shift}^{PUCCH}$), and $\Delta_{shift}^{PUCCH} \in \{1, 2, 3\}$ represents 12, 6 or 4 shifts.

A frequency-domain-spread ACK/NACK signal is spread in the time domain using an orthogonal spreading code. As the orthogonal spreading code, a Walsh-Hadamard sequence or a DFT sequence may be used. For example, the ACK/NACK signal may be spread using orthogonal sequences (w0, w1, w2, w3) with a length of 4 for four symbols. In addition, the RS may also be spread using an orthogonal sequence with a length of 3 or 2, which is referred to as orthogonal covering (OC).

A plurality of UEs may be multiplexed in a code division multiplexing (CDM) scheme using CS resources in the frequency domain and OC resources in the time domain as described above. That is, ACK/NACK information and RSs of a large number of UEs may be multiplexed on the same PUCCH RB.

In time domain spreading CDM, the number of supported spreading codes for the ACK/NACK information is restricted by the number of RS symbols. That is, the number of SC-FDMA symbols for RS transmission is smaller than the number of SC-FDMA symbols for ACK/NACK transmission, and therefore multiplexing capacity of an RS is lower than multiplexing capacity of the ACK/NACK information. For example, in the case of a normal CP, the ACK/NACK information may be transmitted in four symbols, but three orthogonal spreading codes are used rather than four orthogonal spreading codes for the ACK/NACK information. This is because the number of RS transmission symbols is limited to three and thus only three orthogonal spreading codes can be used for the RS.

Examples of an orthogonal sequence used in spreading ACK/NACK information are shown in Tables 2 and 3. Table 2 shows a sequence for a symbol having a length of 4 and Table 3 shows a sequence for a symbol having a length of 3. The sequence for the symbol having a length of 4 is used in PUCCH formats 1/1a/1b of a normal subframe configuration. Considering a case in which an SRS is transmitted on the last symbol of the second slot in a subframe configuration, the sequence for the symbol with the length of 4 may be applied to the first slot and shortened PUCCH formats 1/1a/1b of the sequence for the symbol with the length of 3 may be applied to the second slot.

TABLE 2

| Sequence index $n_{oc}^{(\tilde{p})}$ ($n_s$) | Orthogonal sequences [w(0) ... w($N_{SF}^{PUCCH}$ − 1)] |
|---|---|
| 0 | [+1 +1 +1 +1] |
| 1 | [+1 −1 +1 −1] |
| 2 | [+1 −1 −1 +1] |

TABLE 3

| Sequence index $n_{oc}^{(\tilde{p})}$ ($n_s$) | Orthogonal sequences [w(0) ... w($N_{SF}^{PUCCH}$ − 1)] |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

When three symbols are used for RS transmission and four symbols are used for ACK/NACK information transmission in a slot of a subframe of the normal CP, if, for example, six CSs in the frequency domain and three OC resources in the time domain are allowed to be used, HARQ ACK/NACK signals from 18 different UEs may be multiplexed in a PUCCH RB. When two symbols are used for RS transmission and four symbols are used for ACK/NACK information transmission in a slot of a subframe of the extended CP, if, for example, six CSs in the frequency domain and two OC resources in the time domain are allowed to be used, HARQ ACK/NACK signals from 12 different UEs may be multiplexed in a PUCCH RB.

Hereinafter, PUCCH format 1 will be described. A scheduling request (SR) is transmitted by requesting scheduling of the UE or not requesting scheduling of the UE. An SR channel reuses an ACK/NACK channel structure in PUCCH formats 1a/1b and is configured in an on-off keying (OOK) manner based on the design of the ACK/NACK channel. An RS is not transmitted on an SR channel. Thus, a sequence with a length of 7 is used in the case of the normal CP, and a sequence with a length of 6 is used in the case of the extended CP. Different CSs or orthogonal covers may be allocated to an SR and ACK/NACK. That is, in implementing transmission of a positive SR, the UE transmits HARQ ACK/NACK through resources allocated for the SR. In implementing transmission of a negative SR, the UE transmits HARQ ACK/NACK through resources allocated for ACK/NACK.

Hereinafter, PUCCH formats 2/2a/2b will be described. PUCCH formats 2/2a/2b are control channels for transmission of channel measurement feedback (CQI, PMI and RI).

A report period of the channel measurement feedback (hereinafter, referred to as CQI information) and a frequency unit (or frequency resolution) subject to measurement may be controlled by a BS. Periodic and aperiodic CQI reports may be supported in the time domain. PUCCH format 2 may be used only for the periodic report and a PUSCH may be used for the aperiodic report. In the case of the aperiodic report, the BS may instruct the UE to transmit an individual CQI report on a resource scheduled for UL data transmission.

Figure 8:
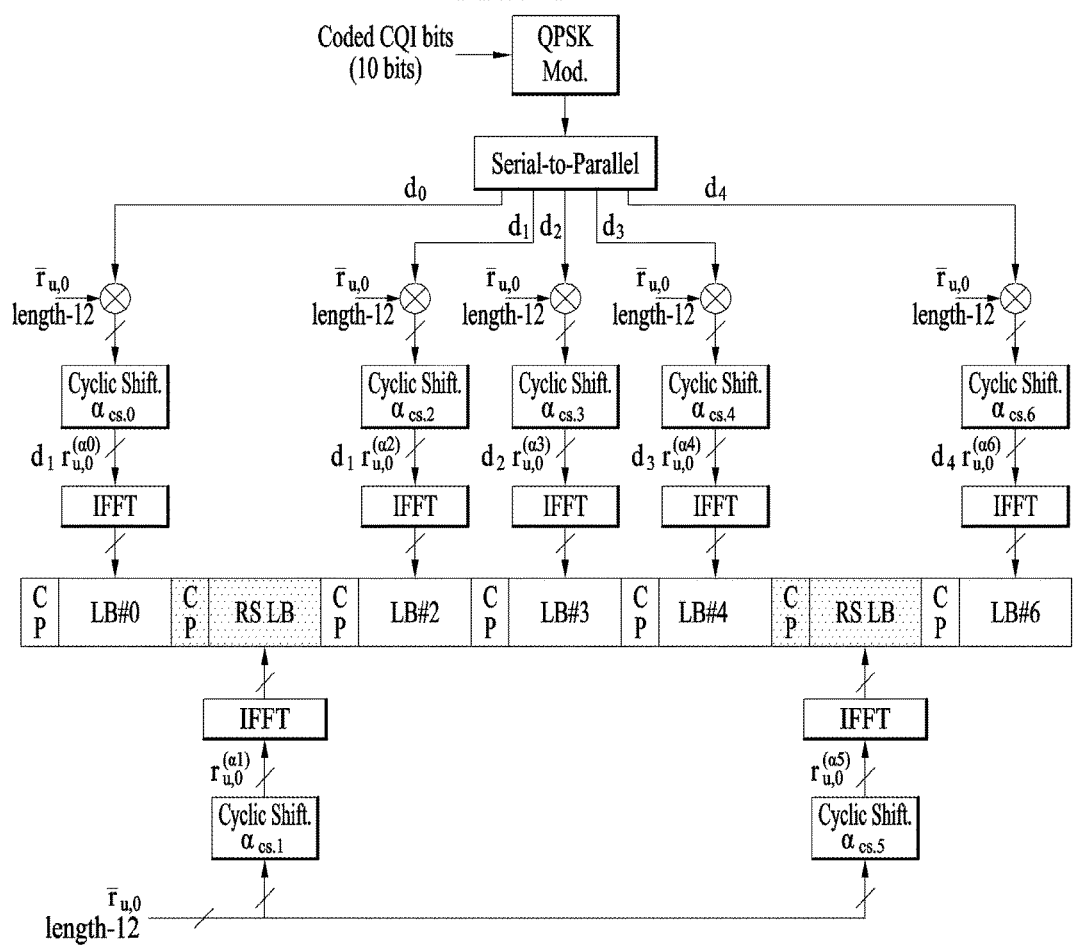
FIG. 8 is a diagram for a CQI channel structure in case of normal CP.

FIG. 8 illustrates a CQI channel structure for a normal CP. SC-FDMA symbols #1 and #5 (second and sixth symbols) from among SC-FDMA symbols #0 to #6 of a slot may be used to transmit a demodulation reference signal (DMRS), and CQI information may be transmitted in the remaining SC-FDMA symbols. In the case of an extended CP, one SC-FDMA symbol (SC-FDMA symbol #3) is used to transmit the DMRS.

In PUCCH formats 2/2a/2b, modulation by a CAZAC sequence is supported, and a symbol modulated according to QPSK is multiplied by a CAZAC sequence with a length of 12. The CS of the sequence is changed between symbols and between slots. OC is used for the DMRS.

Of the seven SC-FDMA symbols included in a slot, two SC-FDMA symbols spaced apart by an interval of three SC-FDMA symbols carry DMRSs and the remaining five SC-FDMA symbols carry CQI information. Two RSs are used in a slot in order to support a high-speed UE. A UE is identified using a CS sequence. CQI information symbols are modulated into SC-FDMA symbols and transmitted. An SC-FDMA symbol includes a sequence. That is, a UE modulates CQI into each sequence and transmits the sequences.

The number of symbols that can be transmitted in a TTI is 10 and QPSK is determined for modulation of CQI information. When QPSK mapping is employed for the SC-FDMA symbols, an SC-FDMA symbol may carry a 2-bit CQI value and thus a slot may carry a 10-bit CQI value. Accordingly, a maximum of a 20-bit CQI value may be carried in a subframe. To spread the CQI information in the frequency domain, a frequency domain spreading code is used.

A CAZAC sequence with a length of 12 (e.g., a ZC sequence) may be used for the frequency domain spreading code. Control channels may be distinguished from each other using CAZAC sequences having different CS values. The frequency-domain-spread CQI information is subjected to IFFT.

12 different UEs may be orthogonally multiplexed in the same PUCCH RB using 12 equally spaced CSs. For the normal CP, a DMRS sequence on SC-FDMA symbols #1 and #5 (SC-FDMA symbols #3 for the extended CP) is similar to a CQI signal sequence in the frequency domain, but the DMRS sequence is not modulated as in the case of the CQI information. A UE may be semi-statically set by higher layer signaling so as to periodically report different CQI, PMI and RI types on a PUCCH resource indicated by a PUCCH resource index $n_{PUCCH}^{(2)}$. Herein, the PUCCH resource index $N_{PUCCH}^{(2)}$ is information indicating a PUCCH region and a CS value used for PUCCH format 2/2a/2b transmission.

Hereinafter, an enhanced-PUCCH (e-PUCCH) format will be described. The e-PUCCH format may correspond to PUCCH format 3 in LTE-A. Block spreading may be applied to ACK/NACK transmission using PUCCH format 3.

Block spreading is a method of modulating a control signal using SC-FDMA, which is distinguished from the PUCCH format 1 or 2 series. As shown in FIG. 9, a symbol sequence may be spread in the time domain using an orthogonal cover code (OCC) and transmitted. Control signals of a plurality UEs may be multiplexed in the same RB using the OCC. In the case of PUCCH format 2 described above, a symbol sequence is transmitted in the time domain and control signals of multiple UEs are multiplexed using a CS of a CAZAC sequence. On the other hand, in the case of a block spreading-based PUCCH format (e.g., PUCCH format 3), a symbol sequence is transmitted in the frequency domain and control signals of multiple UEs are multiplexed through the time domain spreading based on an OCC.

FIG. 9(a) illustrates an example of generation and transmission of four SC-FDMA symbols (i.e., data portions) using an OCC with a length of 4 (or spreading factor (SF)=4) in a symbol sequence during one slot. In this case, three RS symbols (i.e., RS portions) may be used in one slot.

FIG. 9(b) illustrates an example of generation and transmission of five SC-FDMA symbols (i.e., data portions) using an OCC with a length of 5 (or SF=5) in a symbol sequence during one slot. In this case, two RS symbols may be used in one slot.

In the examples of FIG. 9, the RS symbols may be generated from a CAZAC sequence to which a specific CS value is applied, and a predetermined OCC may be applied to (or multiplied by) a plurality of RS symbols and transmitted. If 12 modulation symbols are used per OFDM symbol (or SC-FDMA symbol) and each modulation symbol is generated according to QPSK in the examples of FIG. 9, the maximum number of bits that can be transmitted in a slot is 12×2=24. Thus, the total number of bits that can be transmitted in two slots is 48. When the PUCCH channel structure employing the block spreading scheme is used, it may be possible to transmit extended control information compared to the case of existing PUCCH formats 1 and 2.

ACK/NACK Multiplexing Scheme

In ACK/NACK multiplexing, content of an ACK/NACK to a plurality of data units may be identified by a combination of an ACK/NACK unit actually used for ACK/NACK transmission and one of QPSK-modulated symbols. For example, suppose that an ACK/NACK unit carries 2-bit information and receives a maximum of two data units. Herein, it is assumed that a HARQ ACK/NACK for each of the received data units is represented by an ACK/NACK bit. In this case, a transmitter that has transmitted data may identify the ACK/NACK results as shown below in Table 4.

TABLE 4

| HARQ-ACK(0), HARQ-ACK(1) | $n_{PUCCH}^{(1)}$ | b(0), b(1) |
| --- | --- | --- |
| ACK, ACK | $n_{PUCCH,1}^{(1)}$ | 1, 1 |
| ACK, NACK/DTX | $n_{PUCCH,0}^{(1)}$ | 0, 1 |
| NACK/DTX, ACK | $n_{PUCCH,1}^{(1)}$ | 0, 0 |
| NACK/DTX, NACK | $n_{PUCCH,1}^{(1)}$ | 1, 0 |
| NACK, DTX | $n_{PUCCH,0}^{(1)}$ | 1, 0 |
| DTX, DTX | N/A | N/A |

In Table 4, HARQ-ACK(i) (i=0, 1) represents an ACK/NACK result with respect to data unit i. Since a maximum of two data units (data unit 0 and data unit 1) is assumed to be received as described above, an ACK/NACK result with respect to data unit 0 is represented as HARQ-ACK(0) and an ACK/NACK result with respect to data unit 1 is represented as HARQ-ACK(1) in Table 4. Referring to Table 4, DTX (Discontinuous Transmission) indicates that the data unit corresponding to HARQ-ACK(i) is not transmitted or that a receiver cannot detect presence of the data unit corresponding to HARQ-ACK(i). In addition, $n_{PUCCH,X}^{(1)}$ denotes an ACK/NACK unit actually used for ACK/NACK transmission. When there is a maximum of two ACK/NACK units, the ACK/NACK units may be represented as $n_{PUCCH,0}^{(1)}$ and $n_{PUCCH,1}^{(1)}$. In addition, b(0), b(1) denote two bits transmitted by selected ACK/NACK units. Modulation symbols transmitted through ACK/NACK units are determined depending on bits of b(0) and b(1).

For example, when the receiver successfully receives and decodes two data units (as indicated by ACK, ACK in Table 4), the receiver transmits two bits (1, 1) using the ACK/NACK unit $n_{PUCCH,1}^{(1)}$. If the receiver fails to decode (or detect) the first data unit (i.e., data unit 0 corresponding to HARQ-ACK(0)) of the two received data units and successfully decodes the second data unit (i.e. data unit 1 corresponding to HARQ-ACK(1)) (as indicated by NACK/DTX, ACK in Table 4), the receiver transmits two bits (0, 0) using the ACK/NACK unit $n_{PUCCH,1}^{(1)}$.

As such, it is possible to transmit ACK/NACK information about a plurality of data units using one ACK/NACK unit by linking or mapping a combination of a selected ACK/NACK unit and actual bits of the transmitted ACK/NACK unit (i.e., a combination of selected $n_{PUCCH,0}^{(1)}$ or $n_{PUCCH,1}^{(1)}$ and b(0), b(1) in Table 4) to the content of actual ACK/NACK. ACK/NACK multiplexing for more than two data units may be readily implemented by extending the principle of the above-described ACK/NACK multiplexing.

In the ACK/NACK multiplexing scheme described above, NACK and DTX may not be discriminated from each other when at least one ACK is present for each data unit (that is, NACK and DTX may be coupled as NACK/DTX as shown in Table 4). This is because all ACK/NACK states (i.e., ACK/NACK hypotheses) that may be generated when NACK and DTX are discriminated from each other cannot be represented by only combinations of ACK/NACK units and QPSK-modulated symbols. When ACK is not present for any data unit (i.e., when only NACK or DTX is present for all data units), a single definite case of NACK indicating that only one of HARQ-ACKs(i) is a definite NACK (i.e., NACK discriminated from DTX) may be defined. In this case, an ACK/NACK unit corresponding to a data unit for a definite NACK may be reserved for transmission of a plurality of ACK/NACK signals.

PUCCH Piggyback

In UL transmission in a legacy 3GPP LTE system (e.g., a Release-8 system), single carrier transmission with good cubic metric (CM) property or a good peak-to-average power ratio (PAPR), which affects performance of a power amplifier, is maintained to effectively utilize the power amplifier of the UE. That is, single carrier characteristics of data to be transmitted may be maintained through DFT-precoding in the case of PUSCH transmission in the legacy LTE system. In the case of PUCCH transmission, single carrier characteristics may be maintained by carrying information on a sequence having single carrier characteristics. However, if DFT-precoded data is non-continuously assigned on a frequency axis, or if PUSCH and PUCCH are simultaneously transmitted, such single carrier characteristics are not maintained.

Thus, when PUSCH transmission takes place in the same subframe as that for PUCCH transmission as illustrated in FIG. 10, uplink control information (UCI) to be transmitted on a PUCCH may be piggybacked together with data over a PUSCH in order to maintain the single carrier characteristics.

As described above, the legacy LTE UE cannot simultaneously transmit the PUCCH and the PUSCH, and thus the UE multiplexes UCI (CQI/PMI, HARQ-ACK, RI, etc.) in a PUSCH region in a subframe in which the PUSCH is transmitted. For example, when CQI and/or PMI is transmitted in a subframe assigned for PUSCH transmission, UL-SCH data and CQI/PMI may be multiplexed prior to DFT-spreading, such that control information and data are simultaneously transmitted. In this case, rate matching is performed for the UL-SCH data in consideration of CQI/PMI resources. In addition, control information such as HARQ ACK and RI may be multiplexed in the PUSCH region by puncturing the UL-SCH data.

Enhanced-PDCCH (EPDCCH)

In LTE system appearing after release 11, in order to solve a PDCCH capacity deficiency problem caused by CoMP (coordinate multi point), MU-MIMO (multi user-multiple input multiple output) and the like and a PDCCH performance degradation problem due to inter-cell interference, it is considering the use of enhanced-PDCCH (EPDCCH) capable of being transmitted via a legacy PDSCH region. And, unlike a legacy CRS-based PDCCH, the EPDCCH can perform channel estimation based on a DMRS to obtain a pre-coding gain and the like.

EPDCCH transmission can be divided into localized EPDCCH transmission and distributed EPDCCH transmission according to a configuration of PRB (physical resource block) pair used for transmitting EPDCCH. The localized EPDCCH transmission indicates a case that ECCE for transmitting single DCI is adjacent to each other in frequency domain and a specific precoding can be applied to obtain beamforming gain. For instance, the localized EPDCCH transmission can be performed based on contiguous ECCEs of a number corresponding to an aggregation level. On the contrary, the distributed EPDCH transmission may indicate a case that a single EPDCCH is transmitted in PRB pair separated from each other in frequency domain and can obtain a gain in terms of frequency diversity. For instance, the distributed EPDCCH transmission can be performed based on ECCE consisting of 4 EREGs, which are respectively included in a PRB pair separated from each other in frequency domain. One or two EPDCCH (PRB) sets can be configured to a terminal via upper layer signaling and the like and each of the EPDCCH sets can be used for either the localized EPDCCH transmission or the distributed EPDCCH transmission. If there exist two EPDCCH PRB sets, a part of the two EPDCCH PRB sets or all of the two EPDCCH PRB sets can be overlapped with each other.

A base station can transmit control information in one or more EPDCCH PRB sets in a manner of mapping the control information to REs of EREG allocated for EPDCCH. In this case, the EREG is used to define mapping of a control channel which is mapped to an RE. 16 EREGs (EREG number 0 to 15) may exist in a single PRB pair. One ECCE can include 4 EREGs (or 8 EREGs) and one EPDCCH can include x number of ECCEs (x correspond one of 1, 2, 4, 8, 16 and 32). In case of the distributed EPDCCH transmission, EREGs existing in a plurality of PRB pairs can configure a single ECCE. More specifically, in case of the distributed EPDCCH transmission, EREG-to-ECCE mapping (hereinafter, first ECCE number-EREG number-PRB number relation) may indicate that an ECCE index in an EPDCCH PRB set corresponds to an EREG index $$\left\lfloor \frac{n_{ECCE}}{N_P} \right\rfloor + i * N_{CP}$$

in a PRB pair index $$\left(n_{ECCE} + i * \max\left(1, \left\lfloor \frac{N_P}{N} \right\rfloor\right)\right) \bmod N_P.$$

In this case, the N indicates the number of EREGs per ECCE, $N_{CP}$ indicates the number of ECCEs per PRB pair, $N_{P,set1}$ indicates the number of PRB pairs of the first EPDCCH PRB set, $N_{P,set2}$ indicates the number of PRB pairs of a second EPDCCH PRB pair and i indicates 0, 1, . . . , N−1. For instance, if 4 PRB pairs are included in an EPDCCH PRB set, according to the aforementioned first ECCE number-EREG number-PRB number relation, an ECCE index 0 includes an EREG 0 of a PRB pair 0, an EREG 4 of a PRB pair 1, an EREG 8 of a PRB pair 2, and an EREG 12 of a PRB pair 4. This sort of EREG-to-ECCE mapping relation is shown in FIG. 11.

In order for a terminal to receive/obtain control information (DCI) via EPDCCH, similar to a legacy LTE/LTE-A system, the terminal is able to perform blind decoding. More specifically, the terminal can attempt (monitoring) to decode EPDCCH candidate set according to an aggregation level for DCI formats corresponding to a configured transmission mode. In this case, the EPDCCH candidate set becoming a target of the monitoring can be called an EPDCCH UE-specific search space and the search space can be configured according to an aggregation level. And, somewhat different from the aforementioned legacy LTE/LTE-A, the aggregation level may become {1, 2, 4, 8, 16 and 32} according to a subframe type, a CP length, an amount of available resource amount in a PRB pair and the like.

In case of a terminal to which EPDCCH is configured, REs included in PRB pairs are indexed by an EREG and the EREG can be indexed again in an ECCE unit. An EPDCCH candidate configuring a search space is determined and blind decoding is performed based on the indexed ECCE. BY doing so, it may be able to receive control information.

Having received EPDCCH, a terminal can transmit a reception confirmation response (ACK/NACK) on PUCCH in response to the EPDCCH. In this case, similar to the aforementioned Equation 1, a resource being used, i.e., an index of a PUCCH resource can be determined by a lowest ECCE index among ECCEs used for transmitting the EPDCCH. In particular, it may be able to be represented as Equation 2 in the following.

$$n_{PUCCH\text{-}ECCE}^{(1)} = n_{ECCE} + N_{PUCCH}^{(1)}$$ Equation 2

In Equation 2, $n_{PUCCH\text{-}ECCE}^{(1)}$ indicates the PUCCH resource index, $n_{ECCE}$ indicates the lowest ECCE index among ECCEs used for transmitting the EPDCCH and $N_{PUCCH}^{(1)}$ (also represented as $N_{PUCCH,EPDCCH}^{(1)}$) indicates a value delivered via upper layer signaling and indicate a point where the PUCCH resource index starts.

Yet, if PUCCH resource indexes are uniformly determined by the aforementioned Equation 2, a resource collision problem may occur. For instance, in case of configuring two EPDCCH PRB sets, since ECCE indexing is independently performed in each EPDCCH PRB set, a lowest ECCE index in each EPDCCH PRB set may be identical to each other. In this case, if a start point of a PUCCH resource is differentiated according to a user, a problem may be solved. Yet, if the start point of the PUCCH resource is differentiated according to all users, since it may indicate to reserve a huge amount of PUCCH resources, it is inefficient. And, similar to MU-MIMO, since DCI of many users can be transmitted at a same ECCE position in EPDCCH, it is necessary to have a method of allocating PUCCH resource in consideration of the aforementioned cases. In order to solve the aforementioned problem, ARO (HARQ-ACK resource offset) is introduced. The ARO shifts a lowest ECCE index among ECCE indexes configuring EPDCCH and a PUCCH resource determined by a start offset of a PUCCH resource delivered via upper layer signaling to avoid collision of PUCCH resources. The ARO is indicated by 2 bits of DCI format 1A/1B/1D/1/2A/2/2B/2C/2D transmitted on EPDCCH as shown in Table 5 in the following.

TABLE 5

| ACK/NACK Resource offset field in DCI format 1A/1B/1D/1/2A/2/2B/2C/2D | $\Delta_{ARO}$ |
|---|---|
| 0 | 0 |
| 1 | −1 |
| 2 | −2 |
| 3 | 2 |

A base station selects a value from ARO values shown in Table 5 for a specific terminal and may be then able to inform the specific terminal of the ARO for determining a PUCCH resource via a DCI format. The terminal detects an ARO field in a DCI format of the terminal and may be able to transmit a reception confirmation response via a PUCCH resource determined using a value of the ARQ field.

Meanwhile, until LTE release 11, the maximum number of PRB pairs included in a single EPDCCH PRB set corresponds to 8. Yet, due to various reasons such as application of carrier aggregation and the like, it may be able to use an EPDCCH PRB set including PRB pairs of a greater number. In this case, if there exist two EPDCCH PRB sets, it is highly probable that the two sets are overlapped with each other (For clarity, in the following description, it is assume that one relatively smaller EPDCCH PRB set (hereinafter, a first EPDCCH PRB set) is included in another set (hereinafter, a second EPDCCH PRB set) (i.e., a subset relation). If two sets are identical to each other in size, it is assume that the two sets are completely matched with each other, by which the present invention may be non-limited). If sizes (the number of PRB pairs included in each set) of two EPDCCH PRB sets are different from each other, according to the first ECCE number-EREG number-PRB number relation, an index of ECCE corresponding to an identical EREG position in an overlapped PRB pair may be different from each other. Hence, the number of ECCEs incapable of being used for scheduling may increase. And, if ECCEs of an identical index coexist in each set, a problem of PUCCH resource collision may occur. Hence, in the following, methods capable of managing an EPDCCH set of a bigger size (large EPDCCH set) while reducing the aforementioned problems as much as possible are explained.

Embodiment 1

In case of using EPDCCH of a big size, a first embodiment relates to a method of maximally reducing ECCE/EREG, which is incapable of being used due to overlap. In particular, embodiment 1 relates to an influence of a second EPDCCH set influencing on a first EPDCCH set. According to the embodiment 1, when an aggregation level is getting bigger, in case of an ECCE configuring the aggregation level, an index type of the ECCE corresponding to an identical position of an EREG configuring the ECCE is selected to be smallest in a different EPDCCH PRB set.

Figure 12:
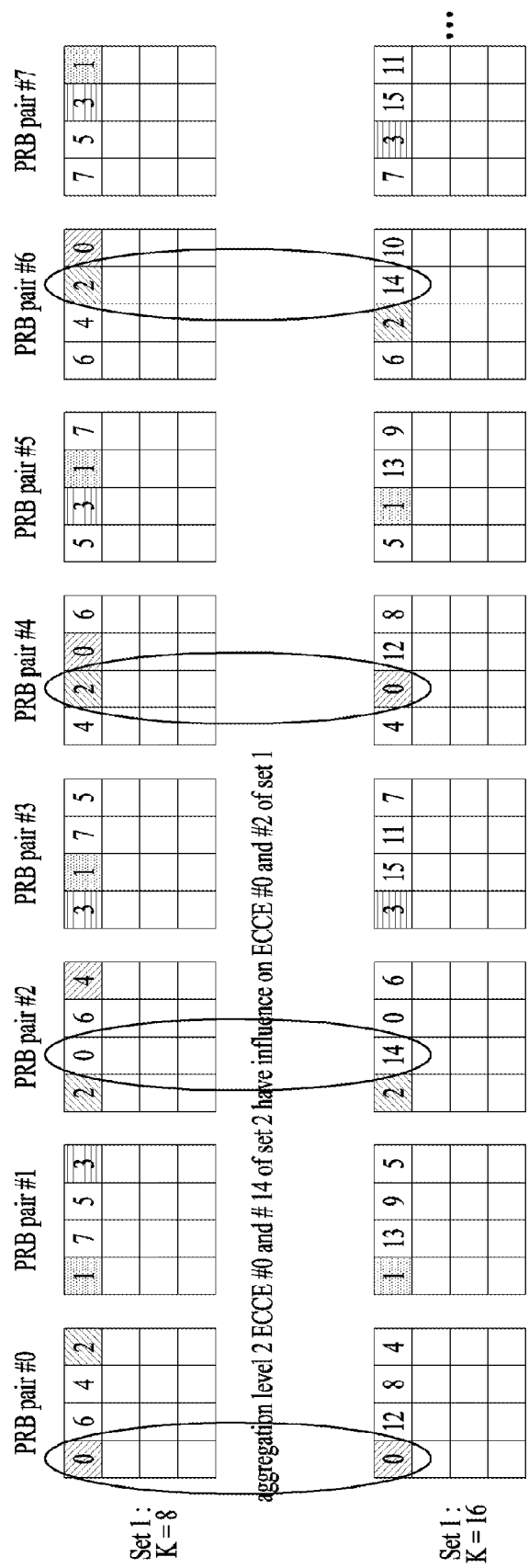

Regarding this, it shall be described with reference to FIG. 12 in the following. In FIG. 12, assume that there exist a first EPDCCH PRB set including 8 PRB pairs and a second EPDCCH PRB set including 16 PRB pairs. In each PRB pair, one box indicates an EREG and a number of the box corresponds to an ECCE number/index corresponding to the EREG. Each EPDCCH PRB set of FIG. 12 is used for distributed EPDCCH transmission and is based on the first ECCE number-EREG number-PRB number relation.

In FIG. 12, if an aggregation level 2 is used in the second EPDCCH PRB set, for instance, ECCE 0 and ECCE 1 can be aggregated with each other. In this case, since it is overlapped with an EREG corresponding to ECCE 0, 1, 2 and 3 of the first EPDCCH PRB set, it may have an influence on 4 ECCEs. As a different example, if ECCE 0 and ECCE 2 are aggregated with each other, it may have an influence on 3 ECCEs including ECCE 0, 2 and 4 of the first EPDCCH PRB set. If ECCE 0 and ECCE 14 are aggregated with each other in the first EPDCCH PRB set, it may have an influence on two ECCEs including ECCE 0 and ECCE 2 of the first EPDCCH PRB set only. Hence, if the aggregation level 2 is used in the second set, ECCE indexes incapable of being used in the first EPDCCH PRB set can be minimized. FIG. 13 shows ECCEs influencing on the first EPDCCH PRB set when two ECCEs are aggregated with each other in the second EPDCCH PRB set. Referring to FIG. 13 (a), if ECCE 0 and ECCE 14 are aggregated with each other in the first EPDCCH PRB set, it may have an influence on ECCE 0 and ECCE 2 of the first EPDCCH PRB set. Referring to FIG. 13 (b), if ECCE 0 and ECCE 12 are aggregated with each other in the first EPDCCH PRB set, it may have an influence on ECCE 0, ECCE 2 and ECCE 6 of the first EPDCCH PRB set. If the aforementioned process is passing through, as shown in FIG. 14, in case of the aggregation level 2, it may be able to induce combinations of ECCEs capable of being used while minimizing an impact on the first EPDCCH PRB set. In particular, in case of the aggregation level 2, as shown in FIG. 14, if ECCE indexes including (0, 14), (1, 15), (2, 4), (3, 5), (6, 8), (7, 9), (10, 12) and (11, 13) are used, it may be able to reduce an influence influencing on a different EPDCCH PRB set.

Table 6 in the following shows a case that the scheme used in FIGS. 13 to 14 is extended. In particular, in case of using the aggregation level 2 in the second EPDCCH PRB set, it may be able to use ECCE indexes according to Table 6 in the following.

Embodiment 2

When two EPDCCH PRB sets are used, in case of using ECCE in one set, methods capable of reducing an influence influencing on another set and solving a PUCCH resource collision problem are disclosed in embodiment 2. In the embodiments described in the following, an ECCE index corresponding to an EREG of an identical position in each of the first EPDCCH PRB set and the second EPDCCH PRB set can be associated with an identical PUCCH resource. In the following, each of the embodiments is explained individually.

Embodiment 2-1

A PRB pair included in a first EPDCCH PRB set can be evenly selected from PRB pairs included in a second EPDCCH PRB set. For instance, the first EPDCCH PRB set can include PRB pairs of which an ECCE index corresponding to an EREG is 1/n multiple of an ECCE index corresponding to an EREG of a position identical to the EREG in the

TABLE 6

| Aggregation level 2 configuration | 0 | 1 | 2 | 3 | 4 | 5 | 6 | 7 |
|---|---|---|---|---|---|---|---|---|
| ECCEs for Set 2 | n*k+0, n*k+14 | n*k+1, n*k+15 | n*k+2, n*k+4 | n*k+3, n*k+5 | n*k+6, n*k+8 | n*k+7, n*k+9 | n*k+10, n*k+12 | n*k+11, n*k+13 |
| Impacted ECCEs in Set 1 | n*k+0, n*k+2 | n*k+1, n*k+3 | n*k+2, n*k+4 | n*k+3, n*k+5 | n*k+4, n*k+6 | n*k+5, n*k+7 | n*k+6, n*k+0 | n*k+7, n*k+1 |

In Table 6, k indicates an EREG group. As defined in a legacy LTE-A, when a single PRB pair includes 16 EREGs, the k has values ranging from 0 to 3. n corresponds to the number of ECCEs included in a single EREG group on the basis of the first EPDCCH PRB set. In an example shown in the above, the n corresponds to 8.

Moreover, in case of an aggregation level 4 and 8, an influence influencing on a different EPDCCH PRB set can be minimized in a manner of aggregating ECCEs with each other according to Table 7 and 8, respectively.

TABLE 7

| Aggregation level 4 configuration | 0 | 1 | 2 | 3 | 4 | 5 |
|---|---|---|---|---|---|---|
| Combination of Aggregation level 2 configurations | #0, #2 (i.e. n*k+0, n*k+14, n*k+2, n*k+4) | #1, #3 | #2, #4 | #3, #5 | #4, #6 | #5, #7 |
| Impacted ECCEs in Set 1 | n*k+0, n*k+2, n*k+4 | n*k+1, n*k+3, n*k+5 | n*k+2, n*k+4, n*k+6 | n*k+3, n*k+5, n*k+7 | n*k+4, n*k+6, n*k+0 | n*k+5, n*k+7, n*k+1 |

TABLE 8

| Aggregation level 8 configuration | 0 | 1 |
|---|---|---|
| Combination of Aggregation level 4 configurations | #0, #4 | #1, #5 |
| Impacted ECCEs in Set 1 | n*k+0, n*k+2, n*k+4, n*k+6 | n*k+1, n*k+3, n*k+5, n*k+7 | second EPDCCH PRB set. In this case, n corresponds to (the number of PRB pairs of the second EPDCCH PRB set) divided by (the number of PRB pairs of the first EPDCCH PRB set). PRB pairs to be used in the first EPDCCH PRB set can be indicated by RRC signaling, a physical layer signal or the like. In this case, it is able to make an ECCE corresponding to an identical resource in each EPDCCH PRB set use an identical PUCCH resource. In particular, in the second EPDCCH PRB set, an ECCE index (n*k+m) is associated with a PUCCH resource corresponding to an index (p*m+k) related to a PUCCH resource. In this case, n corresponds to (the number of PRB pairs of the second EPDCCH PRB set) divided by (the number of PRB pairs of the first EPDCCH PRB set), k corresponds to 0, . . . , (the number of ECCEs included in the first EPDCCH PRB set) and m corresponds to 0, . . . , n−1. And, p corresponds to the number of PUCCH resources associated with the first EPDCCH PRB set. As an example, the p may have a value such as p=32, 32/aggregation level, or the like. Regarding this, it shall be explained in detail with reference to FIG. 15 in the following.

Figure 15:
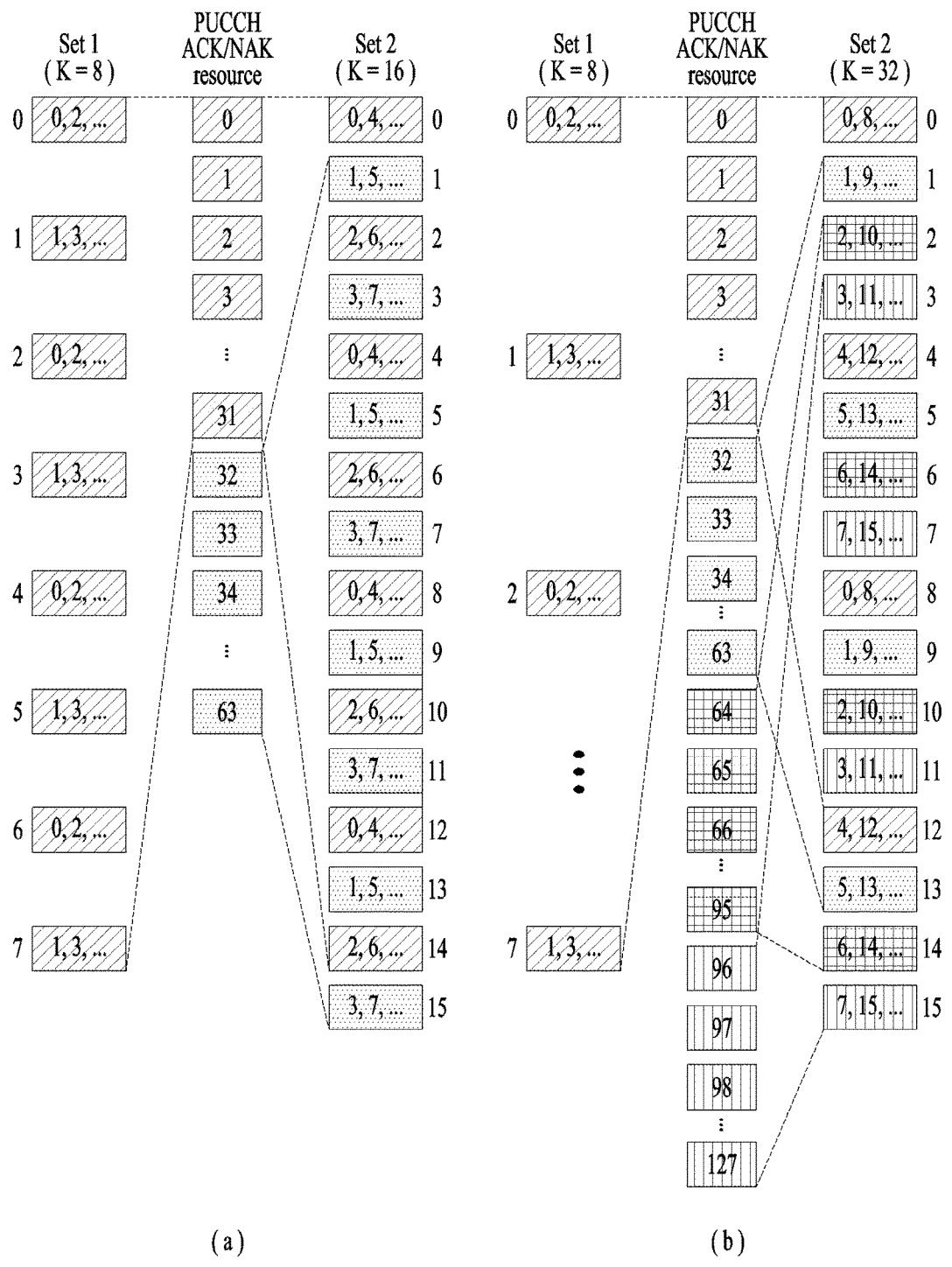

FIG. 15 (a) shows an example of the first EPDCCH PRB set including 8 PRB pairs and the second EPDCCH PRB set including 16 PRB pairs. FIG. 15 (b) shows an example of the first EPDCCH PRB set including 8 PRB pairs and the second EPDCCH PRB set including 32 PRB pairs. Referring to FIG. 15 (a), PRB pairs overlapped with even number PRB pairs of the second EPDCCH PRB set are selected from the first EPDCCH PRB set. In this case, an ECCE index of the second EPDCCH PRB set becomes double of an ECCE index of the first EPDCCH PRB set in an identical EREG. In particular, ECCE indexes used in the first EPDCCH PRB set correspond to 0, 1, 2, . . . , 31 and ECCE indexes used in the PRB pair overlapped with the first EPDCCH PRB set in the second EPDCCH PRB set correspond to 0, 2, 4, . . . , 62. If the first EPDCCH PRB set is configured as mentioned above, a single ECCE of one EPDCCH PRB set may have an influence on a single ECCE of another EPDCCH PRB set only. In addition to this, if an ECCE index of the first EPDCCH PRB set and an ECCE index of the second EPDCCH PRB set are configured to use an identical PUCCH resource for an identical specific EREG, it may be able to prevent a PUCCH resource being collided with each other. In particular, in FIG. 15 (a), ECCE 1 of the first EPDCCH PRB set and ECCE 2 of the second EPDCCH PRB set are configured to use a first PUCCH ACK/NACK resource. Since the ECCE 1 of the first EPDCCH PRB set and the ECCE 2 of the second EPDCCH PRB set are overlapped with each other, a base station does not schedule the ECCE 1 of the first EPDCCH PRB set and the ECCE 2 of the second EPDCCH PRB set at the same time. Hence, there is no chance of PUCCH resource collision.

Embodiment 2-2

According to embodiment 2-1, a PRB pair of the first EPDCCH PRB set is selected and a PUCCH resource is permutated again. On the contrary, it is able to make an ECCE index corresponding an identical EREG position to be identical to each other while the PRB pair of the first EPDCCH PRB set is selected. To this end, a new ECCE-to-EREG mapping scheme can be used. In this case, since the EREG of the identical position has an identical ECCE index, PUCCH resource collision does not occur. Hence, unlike embodiment 2-1, it is not necessary to reconfigure a relation between a PUCCH resource and an ECCE index.

According to embodiment 2-2, the first EPDCCH PRB set can be configured by PRB pairs of which an ECCE index corresponding to an EREG is 1/n multiple of an ECCE index of an EREG of a position identical to a position of the EREG in the second EPDCCH PRB set. In this case, the ECCE index, i.e., a relation between the ECCE and the EREG is based on the first ECCE number-EREG number-PRB number relation. In particular, the PRB pair of the first EPDCCH PRB set is determined/selected using a scheme shown in FIG. 16 (a) or a scheme described in the embodiment 2-1.

In case of following a new ECCE index and a relation between an ECCE index and an EREG (a second ECCE number-EREG number-PRB number relation), which is applied when the second EPDCCH PRB set includes 16 or more PRB pairs, an ECCE index corresponding to an EREG, which is positioned at an identical position in the first EPDCCH PRB set and the second EPDCCH PRB set, is identical to each other.

In this case, the second ECCE number-EREG number-PRB number relation is described in the following.

An ECCE index of an EPDCCH PRB pair corresponds to an EREG index $$\text{index} \left\lfloor \frac{n_{ECCE}}{N_{P,set1}} \right\rfloor \mod N_{CP} + i * N_{CP} \text{ in a PRB pair index}$$

$$\frac{N_{P,set3}}{N_{P,set2}} * \left[ \left\{ n_{ECCE} + i * \max\left(1, \left\lfloor \frac{N_{P,set1}}{N} \right\rfloor \right) \right\} \mod N_{P,set1} \right] +$$

$$\left\lfloor \frac{n_{ECCE}}{N_{P,set2} * N_{CP}} \right\rfloor. \text{ In this case, } N$$

corresponds to the number of EREGs per ECCE, $N_{CP}$ corresponds to the number of ECCEs per PRB pair, $N_{P,set1}$ corresponds to the number of PRB pairs of the first EPDCCH PRB set, $N_{P,set2}$ corresponds the number of PRB pairs of the second EPDCCH PRB set and i corresponds to 0, 1, . . . , N−1.

Embodiment 2-3

According to embodiment 2-2, although an ECCE index for an EREG of an identical position is identical to each other in each EPDCCH PRB set, a PRB pair index is different from each other. As shown in FIG. 16 (b), it is able to make not only the ECCE index for the EREG of the identical position but also the PRB pair index to be identical to each other in each EPDCCH PRB set using a third ECCE number-EREG number-PRB number relation described in the following.

The third ECCE number-EREG number-PRB number relation is described in the following and the third ECCE number-EREG number-PRB number relation is applicable to an EPDCCH PRB set including 16 or more PRB pairs.

An ECCE index of an EPDCCH PRB pair corresponds to an EREG index $$\text{index} \left\lfloor \frac{n_{ECCE}}{N_{P,set1}} \right\rfloor \mod N_{CP} \text{ in a PRB pair}$$

$$\text{index} \left\{ n_{ECCE} + i * \max\left(1, \left\lfloor \frac{N_{P,set1}}{N} \right\rfloor \right) \right\} \mod N_{P,set1} +$$

$$N_{P,set1} * \left\lfloor \frac{n_{ECCE}}{N_{P,set1} + N_{CP}} \right\rfloor. \text{ In this case, } N$$

corresponds to the number of EREGs per ECCE, No) corresponds to the number of ECCEs per PRB pair, $N_{P,set1}$ corresponds to the number of PRB pairs of the first EPDCCH PRB set, $N_{P,set2}$ corresponds to the number of PRB pairs of the second EPDCCH PRB set and i corresponds to 0, 1, . . . , N−1.

In case of following the third ECCE number-EREG number-PRB number relation, indexing can be sequentially performed on each of two EPDCCH PRB sets respectively including 8 PRB pairs. In particular, when two types of combinatorial indexes are signaled on a set including 8 PRB pairs, one combinatorial index is sequentially listed and another combinatorial index is listed to complete a PRB pair index for the set.

Configurations of Devices for Embodiments of the Present Invention

Figure 17:
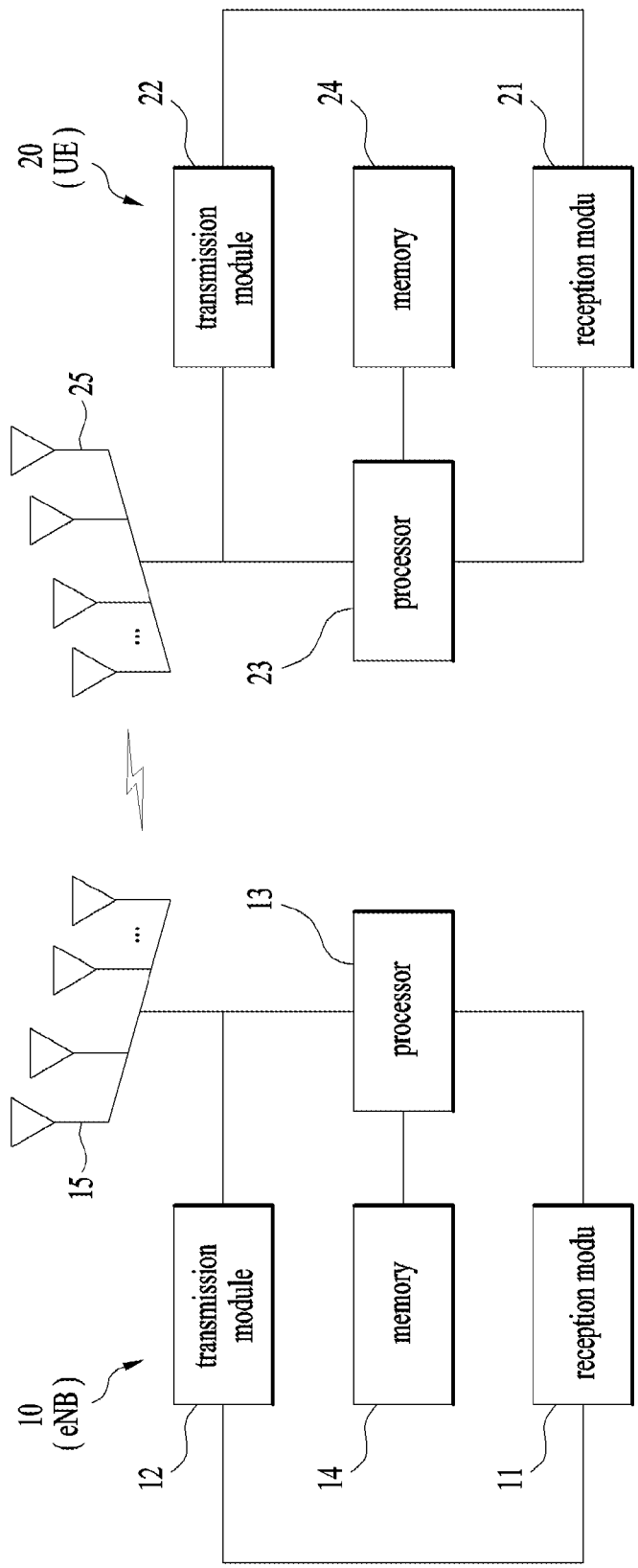
FIG. 17 is a diagram for a configuration of a transceiver.

FIG. 17 is a diagram illustrating configuration of a transmit point apparatus and a UE according to one embodiment of the present invention.

Referring to FIG. 17, a transmit point apparatus 10 may include a receive module 11, a transmit module 12, a processor 13, a memory 14, and a plurality of antennas 15. The antennas 15 represent the transmit point apparatus that supports MIMO transmission and reception. The receive module 11 may receive various signals, data and information from a UE on an uplink. The transmit module 12 may transmit various signals, data and information to a UE on a downlink. The processor 13 may control overall operation of the transmit point apparatus 10.

The processor 13 of the transmit point apparatus 10 according to one embodiment of the present invention may perform processes necessary for the embodiments described above.

Additionally, the processor 13 of the transmit point apparatus 10 may function to operationally process information received by the transmit point apparatus 10 or information to be transmitted from the transmit point apparatus 10, and the memory 14, which may be replaced with an element such as a buffer (not shown), may store the processed information for a predetermined time.

Referring to FIG. 17, a UE 20 may include a receive module 21, a transmit module 22, a processor 23, a memory 24, and a plurality of antennas 25. The antennas 25 represent the UE that supports MIMO transmission and reception. The receive module 21 may receive various signals, data and information from an eNB on a downlink. The transmit module 22 may transmit various signals, data and information to an eNB on an uplink. The processor 23 may control overall operation of the UE 20.

The processor 23 of the UE 20 according to one embodiment of the present invention may perform processes necessary for the embodiments described above.

Additionally, the processor 23 of the UE 20 may function to operationally process information received by the UE 20 or information to be transmitted from the UE 20, and the memory 24, which may be replaced with an element such as a buffer (not shown), may store the processed information for a predetermined time.

The configurations of the transmit point apparatus and the UE as described above may be implemented such that the above-described embodiments can be independently applied or two or more thereof can be simultaneously applied, and description of redundant parts is omitted for clarity.

Description of the transmit point apparatus 10 in FIG. 17 may be equally applied to a relay as a downlink transmitter or an uplink receiver, and description of the UE 20 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

Embodiments of the present invention are applicable to various mobile communication systems.

What is claimed is:

1. A method of transmitting control information by a base station via an EPDCCH (enhanced physical downlink control channel) in a wireless communication system, the method comprising: mapping, by the base station, the control information to EREGs (enhanced resource element groups) allocated for the EPDCCH in a first EPDCCH PRB (physical resource block) set and a second EPDCCH PRB set, respectively; and transmitting, by the base station, the mapped control information to a user equipment, wherein an ECCE (enhanced control channel element) index corresponding to an EREG of a same position is associated with an PUCCH (physical uplink control channel) resource in the first EPDCCH PRB set and the second EPDCCH PRB set, respectively, wherein PRB pairs included in the first EPDCCH PRB set correspond to a subset of PRB pairs included in the second EPDCCH PRB set, wherein the first EPDCCH PRB set comprises PRB pairs of which an ECCE index corresponding to an EREG is 1/n multiple of an ECCE index corresponding to an EREG positioned at an identical position of the EREG in the second EPDCCH PRB set, and wherein n corresponds to the number of PRB pairs of the second EPDCCH PRB set divided by the number of PRB pairs of the first EPDCCH PRB set.

2. The method of claim 1, wherein the first EPDCCH PRB set comprises PRB pairs of which an ECCE index corresponding to an EREG is 1/n multiple of an ECCE index corresponding to an EREG positioned at an identical position of the EREG in the second EPDCCH PRB set,
wherein n corresponds to the number of PRB pairs of the second EPDCCH PRB set divided by the number of PRB pairs of the first EPDCCH PRB set.

3. The method of claim 2, wherein an ECCE index (n*k+m) is associated with a PUCCH resource corresponding to an index (p*m+k) related to a PUCCH resource in the second EPDCCH PRB set, wherein k is 0, . . . , the number of ECCEs contained in the first EPDCCH PRB set, wherein m is 0, . . . , n–1 and wherein p is the number of PUCCH resources associated with the first EPDCCH PRB set.

4. The method of claim 1, wherein the first EPDCCH PRB set comprises PRB pairs of which an ECCE index corresponding to an EREG is 1/n multiple of an ECCE index corresponding to an EREG positioned at an identical position of the EREG in the second EPDCCH PRB set and wherein an ECCE index in the first EPDCCH PRB set and the second EPDCCH PRB set follows a first ECCE number-EREG number-PRB number relation, which is applied when the number of PRB pairs contained in an EPDCCH PRB set is equal to or less than 8.

5. The method of claim 4, wherein when the ECCE index corresponding to the EREG positioned at the identical position follows a second ECCE number-EREG number-PRB number relation, which is applied when the number of PRB pairs of the second EPDCCH PRB set exceeds 8, the ECCE indexes are identical to each other in the first EPDCCH PRB set and the second EPDCCH PRB set.

6. The method of claim 4, wherein in case of the first ECCE number-EREG number-PRB number relation, an ECCE index of EPDCCH PRB set corresponds to an EREG index $$\left\lfloor \frac{n_{ECCE}}{N_P} \right\rfloor + i * N_{CP}$$

in a PRB pair index $$\left( n_{ECCE} + i * \max\left(1, \left\lfloor \frac{N_P}{N} \right\rfloor \right) \right) \bmod N_P,$$

wherein in case of the second ECCE-EREG number-PRB number relation, an ECCE index of each EPDCCH PRB pair corresponds to an EREG index $$\left\lfloor \frac{n_{ECCE}}{N_{P,set1}} \right\rfloor \bmod N_{CP} + i * N_{CP}$$

in a PRB pair index $$\frac{N_{P,set2}}{N_{P,set1}} * \left[ \left\{ n_{ECCE} + i * \max\left(1, \left\lfloor \frac{N_{P,set1}}{N} \right\rfloor \right) \right\} \bmod N_{P,set1} \right] + \left\lfloor \frac{n_{ECCE}}{N_{P,set1} * N_{CP}} \right\rfloor,$$

wherein N is the number of EREGs per ECCE, wherein $N_{CP}$ is the number of ECCEs per PRB pair, wherein $N_P$ is the number of PRB pairs of an EPDCCH PRB set, wherein $N_{P,set1}$ is the number of PRB pairs of the first EPDCCH PRB set, wherein $N_{P,set2}$ is the number of PRB pairs of the second EPDCCH PRB set and i is 0, 1, . . . , N–1.

7. The method of claim 1, wherein an ECCE index of each EPDCCH PRB pair corresponds to an EREG index $$\left\lfloor \frac{n_{ECCE}}{N_{P,set1}} \right\rfloor \bmod N_{CP} + i * N_{CP}$$

in a PRB pair $$\frac{N_{P,set2}}{N_{P,set1}} * \left[ \left\{ n_{ECCE} + i * \max\left(1, \left\lfloor \frac{N_{P,set2}}{N} \right\rfloor \right) \right\} \bmod N_{P,set1} \right] + \left\lfloor \frac{n_{ECCE}}{N_{F,set2} * N_{CP}} \right\rfloor,$$

wherein N is the number of EREGs per ECCE, wherein $N_{CP}$ is the number of ECCEs per PRB pair, wherein $N_{P,set1}$ is the number of PRB pairs of the first EPDCCH PRB set, wherein $N_{P,set2}$ is the number of PRB pairs of the second EPDCCH PRB set and i is 0, 1, . . . , N–1.

8. The method of claim 1, wherein an ECCE index of each EPDCCH PRB pair corresponds to an EREG index $$\left\lfloor \frac{n_{ECCE}}{N_{F,set2}} \right\rfloor \bmod N_{CP} + i * N_{CP}$$

in a PRB pair index $$\left\{ n_{ECCE} + i * \max\left(1, \left\lfloor \frac{N_{F,set1}}{N} \right\rfloor \right) \right\} \bmod N_{P,set1} + N_{P,set1} * \left\lfloor \frac{n_{ECCE}}{N_{P,set2} * N_{CP}} \right\rfloor,$$

wherein N is the number of EREGs per ECCE, wherein $N_{CP}$ is the number of ECCEs per PRB pair, wherein $N_{P,set1}$ is the number of PRB pairs of the first EPDCCH PRB set, wherein $N_{P,set2}$ is the number of PRB pairs of the second EPDCCH PRB set and i is 0, 1, . . . , N–1.

9. The method of claim 8, wherein an ECCE index corresponding to an EREG of an identical position is identical to a PRB pair index in the first EPDCCH PRB set and the second EPDCCH PRB set.

10. The method of claim 1, wherein the first EPDCCH PRB set and the second EPDCCH PRB set are related to distributed EPDCCH transmission.

11. A base station device in a wireless communication system, the base station comprising: a transmitter; and a processor that maps control information to EREGs (enhanced resource element groups) allocated for EPDCCH transmission in a first EPDCCH PRB (physical resource block) set and a second EPDCCH PRB set, respectively, and controls the transmitter to transmit the mapped control information to a user equipment, wherein an ECCE (enhanced control channel element) index corresponding to an EREG of a same position is associated with an PUCCH (physical uplink control channel) resource in the first EPDCCH PRB set and the second EPDCCH PRB set, respectively, wherein PRB pairs included in the first EPDCCH PRB set correspond to a subset of PRB pairs included in the second EPDCCH PRB set, wherein the first EPDCCH PRB set comprises PRB pairs of which an ECCE index corresponding to an EREG is 1/n multiple of an ECCE index corresponding to an EREG positioned at an identical position of the EREG in the second EPDCCH PRB set, and wherein n corresponds to the number of PRB pairs of the second EPDCCH PRB set divided by the number of PRB pairs of the first EPDCCH PRB set.

* * * * *